United States Patent
Gao et al.

(10) Patent No.: US 9,686,778 B2
(45) Date of Patent: Jun. 20, 2017

(54) FEEDBACK INFORMATION TRANSMITTING METHOD AND DEVICE

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 14/906,788

(22) PCT Filed: Jul. 22, 2014

(86) PCT No.: PCT/CN2014/082726
§ 371 (c)(1),
(2) Date: Jan. 21, 2016

(87) PCT Pub. No.: WO2015/010604
PCT Pub. Date: Jan. 29, 2015

(65) Prior Publication Data
US 2016/0174211 A1 Jun. 16, 2016

(30) Foreign Application Priority Data

Jul. 23, 2013 (CN) .......................... 2013 1 0311855

(51) Int. Cl.
*H04W 72/04* (2009.01)
*H04L 1/16* (2006.01)
(Continued)

(52) U.S. Cl.
CPC ........... *H04W 72/0413* (2013.01); *H04L 1/16* (2013.01); *H04L 1/1671* (2013.01);
(Continued)

(58) Field of Classification Search
CPC ... H04W 24/10; H04W 72/04–72/042; H04W 72/1278–72/1289; H04L 5/001; H04L 5/003–5/0098
See application file for complete search history.

(56) References Cited

U.S. PATENT DOCUMENTS

| | | | |
|---|---|---|---|
| 2013/0083742 A1 | 4/2013 | Baldemair et al. | |
| 2013/0229998 A1* | 9/2013 | Noh | H04L 5/001 370/329 |
| 2014/0192740 A1* | 7/2014 | Ekpenyong | H04L 5/0035 370/329 |

FOREIGN PATENT DOCUMENTS

| | | |
|---|---|---|
| CN | 102377537 | 3/2012 |
| CN | 103037529 | 4/2013 |

(Continued)

OTHER PUBLICATIONS

ETRI: "CA extension in support of inter-site CA", 3GPP Draft; R1-131142 SCE-Dual Connectivity, 3rd Generation Partnership Project (3GPP), Mobile Competence Centre; 650, Route Des Lucioles ; F-06921 Sophia-Antipolis Cedex ; France 9 vol. RAN WG1, No. Chicago, USA; Apr. 15, 2013-Apr. 19, 2013 Apr. 6, 2013 (Apr. 6, 2013), XP050697070, Retrieved from the Internet: URL:http://www.3gpp.org/ftp/tsg_ran/WG1_RL_1/TSGR1 72b/ Docs/ [retrieved on Apr. 6, 2013].

(Continued)

*Primary Examiner* — Pao Sinkantarakorn
(74) *Attorney, Agent, or Firm* — Foley & Lardner LLP; James F. Ewing; Paul M. H. Pua

(57) ABSTRACT

Disclosed are a feedback information transmitting method and device, used for addressing a lack of a plan for solving the problem of transmitting uplink control information corresponding to downlink carrier scheduled by a plurality of base stations in a dual connectivity scenario. A terminal of the present invention receives over a first carrier the data (Continued)

scheduled by a first base station, and receives over a second carrier the data scheduled by a second base station; generating first uplink control information for the first carrier, and/or generating second uplink control information for the second carrier; transmitting the generated uplink control information via PUCCH and/or PUSCH over an uplink carrier, the uplink control information comprising at least one of the first uplink control information and the second uplink control information. Therefore, a terminal transmitting uplink control information over only one carrier can send timely feedback of uplink control information corresponding to the downlink carrier scheduled by different base stations, ensuring that different base stations can timely acquire the feedback information corresponding to the downlink carrier scheduled by the different base stations.

14 Claims, 5 Drawing Sheets

(51) Int. Cl.
  H04L 5/00 (2006.01)
  H04W 72/12 (2009.01)
  H04L 1/18 (2006.01)
  H04W 76/02 (2009.01)
  H04W 76/04 (2009.01)
(52) U.S. Cl.
  CPC .......... *H04L 1/1861* (2013.01); *H04L 1/1887* (2013.01); *H04L 5/00* (2013.01); *H04L 5/0055* (2013.01); *H04W 72/1263* (2013.01); *H04W 76/025* (2013.01); *H04W 76/048* (2013.01)

(56) References Cited

FOREIGN PATENT DOCUMENTS

WO    WO-2011/132993      10/2011
WO    WO-2012/061257 A1    5/2012

OTHER PUBLICATIONS

Renesas Mobile Europe: "UL transmission of dual connectivity", 3GPP Draft; R2-131849 UL Transmission of Dual Connectivity, 3rd Generation Partnership Project (3GPP), Mobile Competence Centre ; 650, Route Des Lucioles ; F-06921 Sophia-Antipolis Cedex ; France , vol. RAN WG2, No. Fukuoka, Japan; May 20, 2013-May 24, 2013 May 11, 2013 (May 11, 2013), XP050700075, Retrieved from the Internet: URL:http://www.3gpp.org/ftp/tsg_ran/WG2_RL_2/TSGR2 82/Docs/ [retrieved on May 11, 2013].
International Search Report for PCT/CN2014/082726 mailed Jul. 22, 2014.
Written Opinion of the International Searching Authority for PCT/CN2014/082726 mailed Oct. 27, 2014.
Qualcomm Incorporated: "Air interface considerations for dual connectivity", 3GPP Draft; R2-131159 Small Cell Air Interface Considerations, 3rd Generation Partnership Project (3GPP), Mobile Competence Centre ; 650, Route Des Lucioles ; F-06921 Sophia-Antipolis Cedex ; France, vol. RAN WG2, No. Chicago, USA; Apr. 15, 2013-Apr. 19, 2013 Apr. 4, 2013 (Apr. 4, 2013), XP050699140, Retrieved from the Internet: URL:http://www.3gpp.org/ftp/tsg_ran/WG2_RL2/TSGR2_81bis/Docs/ [retrieved on Apr. 4, 2013].
NTT DoCoMo et al: "RAN2 status on Small Cell Enhancements", 3GPP Draft; R3-131123, 3rd Generation Partnership Project (3GPP), Mobile Competence Centre ; 650, Route Des Lucioles ; F-06921 Sophia-Antipolis Cedex ; France, vol. RAN WG3, No. Fukuoka, Japan; May 20, 2013-May 24, 2013 May 23, 2013 (May 23, 2013), XP050701131, Retrieved from the Internet: URL:http://www.3gpp.org/ftp/tsg_ran/WG3_lu/TSGR3_80/Docs/ [retrieved on May 23, 2013].

* cited by examiner

--Prior Art--

--Prior Art--

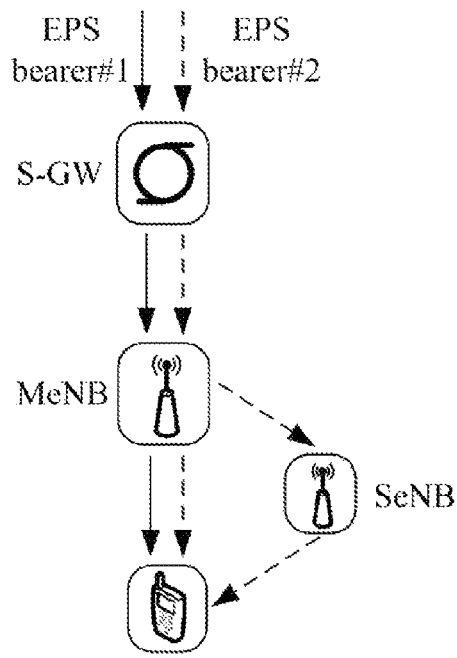

Fig.3

--Prior Art--

A terminal receives data over a first carrier, and receives data over a second carrier, where the data over the first carrier are scheduled by a first base station, and the data over the second carrier are scheduled by a second base station — 41

The terminal generates first uplink control information for the first carrier and/or the terminal generates second uplink control information for the second carrier — 42

The terminal transmits the uplink control information generated by the terminal, including at least one of the first uplink control information and the second uplink control information, through a PUCCH and/or a PUSCH over one uplink carrier — 43

Fig.4

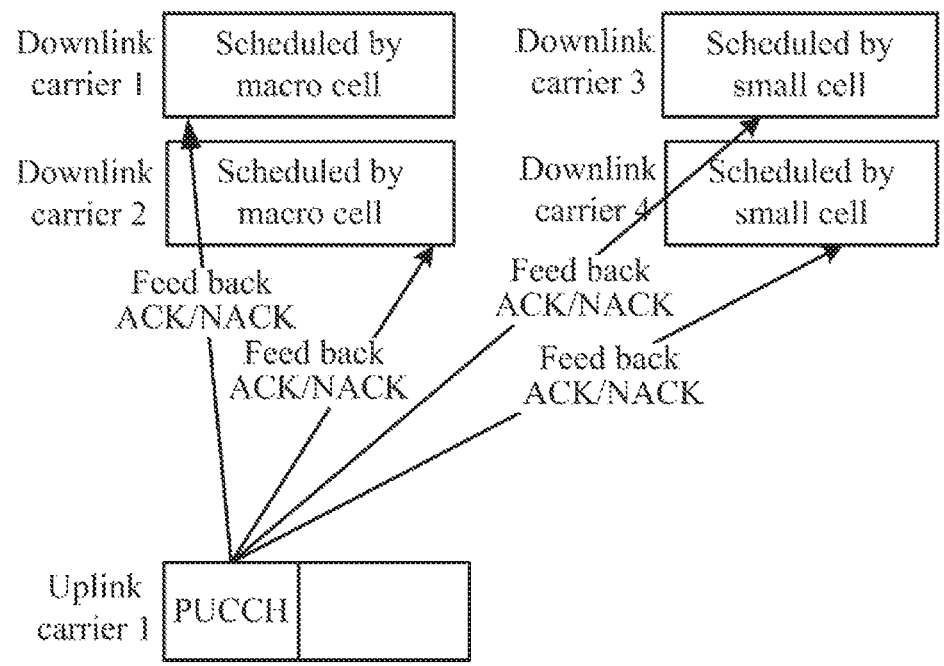

FEEDBACK INFORMATION TRANSMITTING METHOD AND DEVICE

This application is a U.S. National Stage of International Application No. PCT/CN2014/082726, filed on Jul. 22, 2014, designating the United States, and claiming the benefit of Chinese Patent Application No. 201310311855.1, filed with the State Intellectual Property Office of People's Republic of China on Jul. 23, 2013 and entitled "Method and device for transmitting feedback information", which is hereby incorporated by reference in its entirety.

FIELD

The present invention relates to the field of communications and particularly to a method and device for transmitting feedback information.

BACKGROUND

Along with the technical evolvement and emerging data services, such a scenario may occur in later releases of the Long Term Evolution-Advance (LTE-A) system that a terminal is configured to operate while being served by a plurality of base stations (i.e., dual connectivity).

For example, a terminal is configured with a Master Evolved NodeB (MeNB) and at least one Secondary eNB (SeNB), where in the dual connectivity application scenario, at least an S1-MME (wherein MME stands for a Mobility Management Entity (MME), and S1 stands for an S1 interface to the MME) is terminated at the MeNB, so from the prospective of a core network, the MeNB can be regarded as a mobility anchor; and the SeNB is responsible for providing the terminal with an additional radio resource in addition to that provided by the MeNB.

In the dual connectivity scenario, frame structures applied to cells and/or carriers scheduled by different base stations may be the same, or may be different. For example, a Frequency Division Duplex (FDD) frame structure is applied over the respective carriers scheduled by the different base stations for the UE, or a Time Division Duplex (TDD) frame structure is applied over the respective carriers scheduled by the different base stations for the terminal (wherein TDD uplink/downlink configurations applied to the respective carriers scheduled by the different base stations may be the same, or may be different), or an FDD frame structure is applied over respective carriers in one frequency band, and a TDD frame structure is applied over respective carriers in another frequency band, for the terminal.

In the dual connectivity scenario, the plurality of base stations which the terminal is connected with schedule their respective sets of downlink carriers separately, where the method for scheduling and transmitting the data of terminal includes the following three options:

In a first option, bearers of the MeNB are routed directly to the MeNB from a gateway (e.g., a Serving Gateway (S-GW)); and bearers of the SeNB are routed directly to the SeNB from the gateway, that is, the bearers of the SeNB are not routed through the MeNB, as illustrated in FIG. 1;

In a second option, bearers of the MeNB are routed directly to the MeNB from a gateway; and bearers of the SeNB are firstly routed to the MeNB from the gateway, and then all the bearers are offloaded by the MeNB to the SeNB, that is, the bearers of the SeNB are not separated, as illustrated in FIG. 2; and In a third option, bearers of the MeNB are routed directly to the MeNB from a gateway; and bearers of the SeNB are firstly routed to the MeNB from the gateway, and then a part of the bearers are offloaded by the MeNB to the SeNB, whereas another part of the bearers remain transmitted at the MeNB side, that is, the bearers of the SeNB are separated, as illustrated in FIG. 3.

In view of the complexity and cost of radio frequencies, the terminal may only transmit in a single cell/over a single carrier in the uplink; and since the terminal operating in the dual connectivity scenario above transmits over only one uplink carrier in the uplink, uplink control information generated by the terminal for the downlink carriers scheduled by the different base stations will be fed back to the respective base stations over the one uplink carrier, for example, Acknowledgement (ACK)/Negative Acknowledgement (NACK) feedback information for downlink data, from the base stations, received by the terminal will be fed back to the respective base stations over the one uplink carrier, and in another example, Channel State Information (CSI) generated by the UE for the downlink carriers scheduled by the different base stations will also be fed back to the respective base stations over the one uplink carrier.

However there has been absent so far a technical solution to transmission of uplink control information corresponding to downlink carriers scheduled respectively by a plurality of base stations in the dual connectivity scenario.

SUMMARY

Embodiments of the invention provide a method and device for transmitting uplink control information so as to address the problem that there has been absent so far a technical solution to transmission of uplink control information corresponding to downlink carriers scheduled respectively by a plurality of base stations in the dual connectivity scenario.

An embodiment of the invention provides a method for transmitting uplink control information, the method including:

receiving, by a terminal, data over a first carrier, and receiving data over a second carrier, wherein the data over the first carrier are scheduled by a first base station, and the data over the second carrier are scheduled by a second base station;

generating, by the terminal, first uplink control information for the first carrier and/or to generating, by the terminal, second uplink control information for the second carrier; and transmitting, by the terminal, the uplink control information generated by the terminal, including at least one of the first uplink control information and the second uplink control information, through a Physical Uplink Control Channel (PUCCH) and/or a Physical Uplink Shared Channel (PUSCH) over one uplink carrier.

With the method for transmitting uplink control information according to the embodiment of the invention, if the terminal receives data over downlink carriers scheduled by the different base stations, and transmits uplink data over only one uplink carrier, then the terminal will transmit feedback information corresponding to the downlink data scheduled by the base stations in PUCCH or PUSCH, so the terminal transmitting the uplink data over the only uplink carrier can make feedbacks in a timely manner for the downlink data scheduled by the different base stations so that the different base stations can obtain in a timely manner ACK/NACK, CSI and other feedback information corresponding to the downlink carriers scheduled by the respective base stations, and schedule and retransmit based upon the feedback information corresponding to the respective base stations, thus improving the throughput and efficiency of the system.

In an implementation, transmitting, by the terminal, the uplink control information through the PUCCH and/or the PUSCH over the one uplink carrier includes:

in a first approach, transmitting, by the terminal, the first uplink control information and the second uplink control information concurrently through the same PUCCH or PUSCH over the one uplink carrier; or in a second approach, transmitting, by the UE, the first uplink control information through a first PUCCH using a first PUCCH resource over the one uplink carrier and/or transmitting the second uplink control information through a second PUCCH using a second PUCCH resource over the one uplink carrier; or in a third approach, if there is a first PUSCH of the terminal, scheduled by the first base station over the one uplink carrier, then transmitting, by the terminal, the first uplink control information through the first PUSCH over the one uplink carrier to thereby save a resource; otherwise, transmitting, by the terminal, the first uplink control information through a first PUCCH using a first PUCCH resource over the one uplink carrier; and/or if there is a second PUSCH of the UE, scheduled by the second base station over the one uplink carrier, then transmitting, by the terminal, the second uplink control information through the second PUSCH over the one uplink carrier to thereby save a resource; otherwise, transmitting, by the terminal, the second uplink control information through a second PUCCH using a second PUCCH resource over the one uplink carrier;

wherein the first PUCCH resource is different from the second PUCCH resource.

For the first approach, the terminal cascades the first uplink control information and the second uplink control information in a predefined cascade scheme; and the terminal transmits the cascaded uplink control information in the same PUCCH or PUSCH over the one uplink carrier.

For the first approach, if the uplink control information includes Acknowledgement (ACK)/Negative Acknowledgement (NACK) feedback information, then:

generating, by the terminal, the first uplink control information for the first carrier includes: generating, by the terminal, ACK/NACK for downlink sub-frames in which data are received over the first carrier, and generating NACK/Discontinuous Transmission (DTX) for downlink sub-frames in which no data are received over the first carrier, as ACK/NACK feedback information corresponding to the first carrier, wherein if there is no data received over the first carrier, then the terminal will take NACK/DTX as ACK/NACK feedback information corresponding to the first carrier; and generating, by the terminal, the second uplink control information for the second carrier includes: generating, by the terminal, ACK/NACK for downlink sub-frames in which data are received over the second carrier, and generating NACK/DTX for downlink sub-frames in which no data are received over the second carrier, as ACK/NACK feedback information corresponding to the second carrier, wherein if there is no data received over the second carrier, then the terminal will take NACK/DTX as ACK/NACK feedback information corresponding to the second carrier.

For the first approach, before the terminal transmits the uplink control information through the PUCCH and/or the PUSCH over the one uplink carrier, the method further includes:

determining, by the UE, a PUCCH resource over which the uplink control information is to be transmitted, according to received configuration information transmitted by the first base station in higher-layer signaling.

For the second approach and the third approach, if the uplink control information includes ACK/NACK feedback information, then:

generating, by the terminal, the first uplink control information for the first carrier includes: generating, by the terminal, ACK/NACK for downlink sub-frames in which data are received over the first carrier, and generating NACK/Discontinuous Transmission (DTX) for downlink sub-frames in which no data are received over the first carrier, as ACK/NACK feedback information corresponding to the first carrier, wherein if there is no data received over the first carrier, then the terminal will not generate ACK/NACK feedback information corresponding to the first carrier; and generating, by the terminal, the second uplink control information for the second carrier includes: generating, by the terminal, ACK/NACK for downlink sub-frames in which data are received over the second carrier, and generating NACK/DTX for downlink sub-frames in which no data are received over the second carrier, as ACK/NACK feedback information corresponding to the second carrier, wherein if there is no data received over the second carrier, then the terminal will not generate ACK/NACK feedback information corresponding to the second carrier.

For the second approach and the third approach, if the uplink control information includes ACK/NACK feedback information, then before the terminal transmits the uplink control information through the PUCCH and/or the PUSCH over the one uplink carrier, the method further includes:

determining, by the terminal, the first PUCCH resource for the first PUCCH according to received configuration information transmitted by the first base station in higher-layer signaling; or determining, by the terminal, at least one of a plurality of PUCCH resources pre-configured by the first base station for the terminal, as the first PUCCH resource according to an ACK/NACK Resource Indicator (ARI) in a received Physical Downlink Control Channel (PDCCH) or Enhanced PDCCH (EPDCCH) transmitted by the first base station;

and/or determining, by the terminal, the second PUCCH resource for the second PUCCH according to received configuration information transmitted by the first base stations; or determining, by the terminal, the second PUCCH resource for the second PUCCH according to received configuration information transmitted by the second base station; or determining, by the terminal, the second PUCCH resource for the second PUCCH according to an ARI in a received PDCCH or EPDCCH transmitted by the second base station, wherein the second PUCCH resource is at least one of all the available PUCCH resources of the second base station, which is notified in advance by the first base station.

In the second approach and the third approach, the ARI is:

a fixed bit field in the EPDCCHs transmitted by the first base station and the second base station; or an added bit field in the PDCCHs transmitted by the first base station and the second base station; or a reused Transmit Power Control (TPC) field in all the other PDCCHs transmitted by the first base station than a PDCCH corresponding to a Downlink Assignment Index (DAI)=1 of a PCC if the first base station operates in a Time Division Duplex (TDD) system.

For the second approach and the third approach, if the uplink control information includes CSI feedback information, then before the terminal transmits the uplink control information through the PUCCH and/or the PUSCH over the one uplink carrier, the method further includes:

determining, by the terminal, the first PUCCH resource for the first PUCCH according to received configuration information transmitted by the first base station in higher-layer signaling;

and/or determining, by the terminal, the second PUCCH resource for the second PUCCH according to received configuration information transmitted by the first base station in higher-layer signaling; or determining, by the terminal, the second PUCCH resource for the second PUCCH according to received configuration information transmitted by the second base station, wherein the second PUCCH resource is at least one of all the available PUCCH resources of the second base station which is notified in advance by the first base station.

In an embodiment of the invention, the first base station is a master base station, and the second base station is a secondary base station; or the first base station is a secondary base station, and the second base station is a master base station; or the first base station is a base station of a macro cell, and the second base station is a base station of a small cell; or the first base station is a base station of a small cell, and the second base station is a base station of a macro cell; or the first base station is a base station serving a Primary Component Carrier (PCC) of the terminal, and the second base station is a base station serving at least one Secondary Component Carrier (SCC) of the terminal.

In an embodiment of the invention, the one uplink carrier is: only one uplink carrier over which uplink data are transmitted, configured by the network side for the terminal; or predefined or pre-configured one of a plurality of uplink carriers over which uplink data are transmitted, configured by the network side for the terminal; or an uplink primary component carrier of the terminal.

Based upon the method above for transmitting feedback information, an embodiment of the invention further provides a method for receiving feedback information, the method including:

transmitting, by a first base station, data for a terminal over a first carrier, wherein the terminal is configured with at least the first carrier and a second carrier; and the data over the first carrier are scheduled by the first base station, and data over the second carrier are scheduled by a second base station; and receiving, by the first base station, uplink control information transmitted by the terminal, through a PUCCH or a PUSCH over one uplink carrier over which uplink control information corresponding to the respective base stations scheduling data to the terminal is transmitted.

With the method for receiving feedback information according to the embodiment of the invention, all the different base stations scheduling data to the terminal can receive the uplink control information transmitted by the terminal, through the PUCCHs or PUSCHs over the only one uplink carrier over which the terminal transmits the uplink control information, so that the different base stations can obtain in a timely manner ACK/NACK, CSI and other feedback information corresponding to the downlink carriers scheduled by the respective base stations, and schedule and retransmit based upon the feedback information corresponding to the respective base stations, thus improving the throughput and efficiency of the system.

In an implementation, receiving, by the first base station, the uplink control information transmitted by the terminal, through the PUCCH or the PUSCH over the one uplink carrier includes:

in a first approach, receiving, by the first base station, the uplink control information including first uplink control information and second uplink control information, through one PUCCH or PUSCH over the one uplink carrier; or in a second approach, receiving, by the first base station, the uplink control information including only the first uplink control information but no second uplink control information through a first PUCCH using a first PUCCH resource over the one uplink carrier; or in a third approach, if the first base station schedules a first PUSCH over the first carrier, then receiving, by the first base station, the uplink control information in the first PUSCH over the one uplink carrier to thereby save a resource; otherwise, receiving, by the first base station, the uplink control information through a first PUCCH using a first PUCCH resource over the one uplink carrier; where the uplink control information includes only the first uplink control information but no second uplink control information.

For the first approach, after the first base station receives the uplink control information over the one uplink carrier, the method further includes: obtaining, by the first base station, the first uplink control information from the uplink control information in a predefined cascade scheme.

For the first approach, before the first base station receives the uplink control information over the one uplink carrier, the method further includes: transmitting, by the first base station, configuration information to the terminal in higher-layer signaling to indicate to the terminal at least one PUCCH resource over which the uplink control information is to be transmitted.

For the first approach, preferably the method further includes: notifying, by the first base station, the second base station of a PUCCH resource configured for the terminal.

For the second approach and the third approach, if the uplink control information includes ACK/NACK feedback information, then before the first base station receives the uplink control information over the one uplink carrier, the method further includes:

transmitting, by the first base station, configuration information to the terminal in higher-layer signaling to indicate the first PUCCH resource; or indicating, by the first base station, to the terminal at least one of a plurality of PUCCH resources pre-configured by the first base station for the terminal, as the first PUCCH resource using an ARI in a PDCCH or an EPDCCH;

and/or transmitting, by the first base station, configuration information to the terminal in higher-layer signaling to indicate the second PUCCH resource; or notifying, by the first base station in advance, all the PUCCH resources over the one uplink carrier which can be used by the second base station to the second base station so that the second base station configures the terminal with the second PUCCH resource.

In the second approach and the third approach, the ARI is:

a fixed bit field in the EPDCCHs transmitted by the first base station and the second base station; or an added bit field in the PDCCHs transmitted by the first base station and the second base station; or a reused Transmit Power Control (TPC) field in all the other PDCCHs transmitted by the first base station than a PDCCH corresponding to a Downlink Assignment Index (DAI)=1 of a PCC if the first base station operates in a Time Division Duplex (TDD) system.

For the second approach and the third approach, if the uplink control information includes CSI feedback information, then before the first base station receives the uplink control information over the one uplink carrier, the method further includes:

transmitting, by the first base station, configuration information to the terminal in higher-layer signaling to indicate the first PUCCH resource;

and/or transmitting, by the first base station, configuration information to the terminal in higher-layer signaling to indicate the second PUCCH resource; or notifying, by the first base station in advance, all the PUCCH resources over the one uplink carrier which can be used by the second base station to the second base station so that the second base station configures the terminal with the second PUCCH resource.

In an embodiment of the invention, the first base station is a master base station, and the second base station is a secondary base station; or the first base station is a secondary base station, and the second base station is a master base station; or the first base station is a base station of a macro cell, and the second base station is a base station of a small cell; or the first base station is a base station of a small cell, and the second base station is a base station of a macro cell; or the first base station is a base station serving a Primary Component Carrier (PCC) of the terminal, and the second base station is a base station serving at least one Secondary Component Carrier (SCC) of the terminal.

In an embodiment of the invention, the one uplink carrier is: only one uplink carrier over which uplink data are transmitted, configured by the network side for the terminal; or predefined or pre-configured one of a plurality of uplink carriers over which uplink data are transmitted, configured by the network side for the terminal; or an uplink primary component carrier of the terminal.

An embodiment of the invention provides a terminal including:

a receiving module configured to receive data over a first carrier, and to receive data over a second carrier, wherein the data over the first carrier are scheduled by a first base station, and the data over the second carrier are scheduled by a second base station;

a processing module configured to generate first uplink control information for the first carrier and/or to generate second uplink control information for the second carrier; and a transmitting module configured to transmit the uplink control information generated by the processing module, including at least one of the first uplink control information and the second uplink control information, through a PUCCH and/or a PUSCH over one uplink carrier.

In an implementation, the processing module is configured:

in a first approach, to trigger the transmitting module to transmit the first uplink control information and the second uplink control information concurrently through the same PUCCH or PUSCH over the one uplink carrier; or in a second approach, to trigger the transmitting module to transmit the first uplink control information through a first PUCCH using a first PUCCH resource over the one uplink carrier and/or to transmit the second uplink control information through a second PUCCH of a second PUCCH resource over the one uplink carrier; or in a third approach, if there is a first PUSCH scheduled by the first base station over the one uplink carrier, to trigger the transmitting module to transmit the first uplink control information through the first PUSCH over the one uplink carrier; otherwise, to trigger the transmitting module to transmit the first uplink control information through a first PUCCH using a first PUCCH resource over the one uplink carrier; and/or if there is a second PUSCH scheduled by the second base station over the one uplink carrier, to trigger the transmitting module to transmit the second uplink control information through the second PUSCH over the one uplink carrier; otherwise, to trigger the transmitting module to transmit the second uplink control information through a second PUCCH of a second PUCCH resource over the one uplink carrier;

wherein the first PUCCH resource is different from the second PUCCH resource.

For the first approach, the processing module is configured:

to cascade the first uplink control information and the second uplink control information in a predefined cascade scheme; and to transmit the cascaded uplink control information in the same PUCCH or PUSCH over the one uplink carrier.

For the first approach, if the uplink control information includes Acknowledgement (ACK)/Negative Acknowledgement (NACK) feedback information, then the processing module is configured:

to generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, wherein if there is no data received over the first carrier, then NACK/DTX will be taken as ACK/NACK feedback information corresponding to the first carrier; and to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then NACK/DTX will be taken as ACK/NACK feedback information corresponding to the second carrier.

For the first approach, the processing module is further configured:

to determine a PUCCH resource over which the uplink control information is to be transmitted, according to received configuration information transmitted by the first base station in higher-layer signaling.

For the second approach and the third approach, if the uplink control information includes ACK/NACK feedback information, then the processing module is configured:

to generate ACK/NACK for downlink sub-frames in which data are received over the first carrier, and to generate NACK Discontinuous Transmission (DTX) for downlink sub-frames in which no data are received over the first carrier, as ACK/NACK feedback information corresponding to the first carrier, wherein if there is no data received over the first carrier, then no ACK/NACK feedback information corresponding to the first carrier will be generated; and to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then no ACK/NACK feedback information corresponding to the second carrier will be generated.

For the second approach and the third approach, if the uplink control information includes ACK/NACK feedback information, then the processing module is further configured:

to determine the first PUCCH resource for the first PUCCH according to received configuration information transmitted by the first base station in higher-layer signaling; or to determine at least one of a plurality of PUCCH resources pre-configured by the first base station for the terminal, as the first PUCCH resource according to an ARI in a received PDCCH or EPDCCH transmitted by the first base station:

and/or to determine the second PUCCH resource for the second PUCCH according to received configuration information transmitted by the first base station; or to determine the second PUCCH resource for the second PUCCH according to received configuration information transmitted by the second base station; or to determine the second PUCCH resource for the second PUCCH according to an ARI in a received PDCCH or EPDCCH transmitted by the second base station, wherein the second PUCCH resource is at least one of all the available PUCCH resources of the second base station which is notified in advance by the first base station.

In the second approach and the third approach, if the uplink control information includes CSI feedback information, then the processing module is further configured:

to determine the first PUCCH resource for the first PUCCH according to received configuration information transmitted by the first base station in higher-layer signaling; and/or to determine the second PUCCH resource for the second PUCCH according to received configuration information transmitted by the first base station in higher-layer signaling; or to determine the second PUCCH resource for the second PUCCH according to received configuration information transmitted by the second base station, wherein the second PUCCH resource is at least one of all the available PUCCH resources of the second base station which is notified in advance by the first base station.

An embodiment of the invention further provides another terminal including a transceiver, and at least one processor connected with the transceiver, wherein:

the transceiver is configured to receive data over a first carrier, and to receive data over a second carrier, wherein the data over the first carrier are scheduled by a first base station, and the data over the second carrier are scheduled by a second base station;

the processor is configured to generate first uplink control information for the first carrier and/or to generate second uplink control information for the second carrier; and to trigger the transceiver to transmit the uplink control information generated by the processor, including at least one of the first uplink control information and the second uplink control information, through a PUCCH and/or a PUSCH over one uplink carrier.

In an implementation, the processor is configured:

in a first approach, to trigger the transceiver to transmit the first uplink control information and the second uplink control information concurrently through the same PUCCH or PUSCH over the one uplink carrier; or in a second approach, to trigger the transceiver to transmit the first uplink control information through a first PUCCH using a first PUCCH resource over the one uplink carrier and/or to transmit the second uplink control information through a second PUCCH of a second PUCCH resource over the one uplink carrier; or in a third approach, if there is a first PUSCH scheduled by the first base station over the one uplink carrier, to trigger the transceiver to transmit the first uplink control information through the first PUSCH over the one uplink carrier; otherwise, to trigger the transceiver to transmit the first uplink control information through a first PUCCH using a first PUCCH resource over the one uplink carrier; and/or if there is a second PUSCH scheduled by the second base station over the one uplink carrier, to trigger the transceiver to transmit the second uplink control information through the second PUSCH over the one uplink carrier; otherwise, to trigger the transceiver to transmit the second uplink control information through a second PUCCH of a second PUCCH resource over the one uplink carrier;

wherein the first PUCCH resource is different from the second PUCCH resource.

For the first approach, the processor is configured:

to cascade the first uplink control information and the second uplink control information in a predefined cascade scheme; and to transmit the cascaded uplink control information in the same PUCCH or PUSCH over the one uplink carrier.

For the first approach, if the uplink control information includes Acknowledgement (ACK)/Negative Acknowledgement (NACK) feedback information, then the processor is configured:

to generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, wherein if there is no data received over the first carrier, then NACK/DTX will be taken as ACK/NACK feedback information corresponding to the first carrier; and to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then NACK/DTX will be taken as ACK/NACK feedback information corresponding to the second carrier.

For the first approach, the processor is further configured to determine a PUCCH resource over which the uplink control information is to be transmitted, according to configuration information, received by the transceiver, transmitted by the first base station in higher-layer signaling.

For the second approach and the third approach, if the uplink control information includes ACK/NACK feedback information, then the processor is configured:

to generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, wherein if there is no data received over the first carrier, then no ACK/NACK feedback information corresponding to the first carrier will be generated; and to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then no ACK/NACK feedback information corresponding to the second carrier will be generated.

For the second approach and the third approach, if the uplink control information includes ACK/NACK feedback information, then the processor is further configured:

to determine the first PUCCH resource for the first PUCCH according to configuration information, received by the transceiver, transmitted by the first base station in higher-layer signaling; or to determine at least one of a plurality of PUCCH resources pre-configured by the first base station for the terminal, as the first PUCCH resource according to an ARI in a PDCCH or EPDCCH, received by the transceiver, transmitted by the first base station;

and/or to determine the second PUCCH resource for the second PUCCH according to configuration information, received by the transceiver, transmitted by the first base station; or to determine the second PUCCH resource for the second PUCCH according to configuration information, received by the transceiver, transmitted by the second base station; or to determine the second PUCCH resource for the second PUCCH according to an ARI in a PDCCH or EPDCCH, received by the transceiver, transmitted by the second base station, wherein the second PUCCH resource is at least one of all the available PUCCH resources of the second base station which is notified in advance by the first base station.

For the second approach and the third approach, if the uplink control information includes CSI feedback information, then the processor is further configured:

to determine the first PUCCH resource for the first PUCCH according to configuration information, received by the transceiver, transmitted by the first base station in higher-layer signaling;

and/or to determine the second PUCCH resource for the second PUCCH according to configuration information, received by the transceiver, transmitted by the first base station in higher-layer signaling; or to determine the second PUCCH resource for the second PUCCH according to configuration information, received by the transceiver, transmitted by the second base station, wherein the second PUCCH resource is at least one of all the available PUCCH resources of the second base station which is notified in advance by the first base station.

If the terminal according to the embodiments of the invention receives data over downlink carriers scheduled by the different base stations, and transmits uplink data over only one uplink carrier, then the terminal will transmit feedback information corresponding to the downlink data scheduled by the base stations, through the PUCCHs and/or the PUSCHs over the one uplink carrier, so the terminal transmitting the uplink data over the only uplink carrier can make feedbacks in a timely manner for the downlink data scheduled by the different base stations so that the different base stations can obtain in a timely manner ACK/NACK, CSI and other feedback information corresponding to the downlink carriers scheduled by the respective base stations, and schedule and retransmit based upon the feedback information corresponding to the respective base stations, thus improving the throughput and efficiency of the system.

An embodiment of the invention provides a base station including:

a data transmitting module configured to transmit data for a terminal over a first carrier, wherein the terminal is configured with at least the first carrier and a second carrier; and the data over the first carrier are scheduled by the first base station, and data over the second carrier are scheduled by a second base station; and a processing module configured to receive uplink control information transmitted by the terminal, through a PUCCH or a PUSCH over one uplink carrier over which uplink control information corresponding to the respective base stations scheduling data to the terminal is transmitted.

In an implementation, the processing module is configured:

in a first approach, to receive the uplink control information including first uplink control information and second uplink control information, through one PUCCH or PUSCH over the one uplink carrier; or in a second approach, to receive the uplink control information including only the first uplink control information but no second uplink control information through a first PUCCH using a first PUCCH resource over the one uplink carrier; or in a third approach, if a first PUSCH is scheduled over the first carrier, to receive the uplink control information through the first PUSCH over the one uplink carrier to thereby save a resource; otherwise, to receive the uplink control information through a first PUCCH using a first PUCCH resource over the one uplink carrier; where the uplink control information includes first uplink control information but no second uplink control information.

For the first approach, after the uplink control information is received over the one uplink carrier, the processing module is further configured:

to obtain the first uplink control information from the uplink control information in a predefined cascade scheme.

For the first approach, before the uplink control information is received over the one uplink carrier, the processing module is further configured:

to transmit configuration information to the terminal in higher-layer signaling to indicate to the terminal at least one PUCCH resource over which the uplink control information is to be transmitted.

For the first approach, the data transmitting module is further configured:

to notify the second base station of a PUCCH resource configured for the terminal.

For the second approach and the third approach, if the uplink control information includes ACK/NACK feedback information, then the processing module is further configured:

to transmit configuration information to the terminal in higher-layer signaling to indicate the first PUCCH resource; or to indicate to the terminal at least one of a plurality of PUCCH resources pre-configured for the terminal, as the first PUCCH resource using an ARI in a PDCCH or an EPDCCH;

and/or to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

For the second approach and the third approach, if the uplink control information includes CSI feedback information, then the processing module is further configured:

to transmit configuration information to the terminal in higher-layer signaling to indicate the first PUCCH resource;

and/or to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

An embodiment of the invention further provides a base station including a transceiver, and at least one processor connected with the transceiver, wherein:

the transceiver is configured to transmit data for a terminal over a first carrier, wherein the terminal is configured with at least the first carrier and a second carrier; and the data over the first carrier are scheduled by the first base station, and data over the second carrier are scheduled by a second base station; and the processor is configured to trigger the transceiver to receive uplink control information transmitted by the terminal, through a PUCCH or a PUSCH over one uplink carrier over which uplink control information corresponding to the respective base stations scheduling data to the terminal is transmitted.

In an implementation, the processor is configured:

in a first approach, to trigger the transceiver to receive the uplink control information including first uplink control information and second uplink control information, through one PUCCH or PUSCH over the one uplink carrier; or in a second approach, to trigger the transceiver to receive the uplink control information including only the first uplink control information but no second uplink control information through a first PUCCH using a first PUCCH resource over the one uplink carrier; or in a third approach, if a first PUSCH is scheduled over the first carrier, to trigger the transceiver to receive the uplink control information through the first PUSCH over the one uplink carrier, otherwise, to trigger the transceiver to receive the uplink control information through a first PUCCH using a first PUCCH resource over the one uplink carrier; where the uplink control information includes first uplink control information but no second uplink control information.

For the first approach, after the uplink control information is received over the one uplink carrier, the processor is further configured to obtain the first uplink control information from the uplink control information in a predefined cascade scheme.

For the first approach, before the uplink control information is received over the one uplink carrier, the processor is further configured to trigger the transceiver to transmit configuration information to the terminal in higher-layer signaling to indicate to the terminal at least one PUCCH resource over which the uplink control information is to be transmitted.

For the first approach, the transceiver is further configured to notify the second base station of a PUCCH resource configured for the terminal.

For the second approach and the third approach, if the uplink control information includes ACK/NACK feedback information, then the processor is further configured:

to trigger the transceiver to transmit configuration information to the terminal in higher-layer signaling to indicate the first PUCCH resource; or to indicate to the terminal at least one of a plurality of PUCCH resources pre-configured for the terminal, as the first PUCCH resource using an ARI in a PDCCH or an EPDCCH;

and/or to trigger the transceiver to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

For the second approach and the third approach, if the uplink control information includes CSI feedback information, then the processor is further configured:

to trigger the transceiver to transmit configuration information to the terminal in higher-layer signaling to indicate the first PUCCH resource;

and/or to trigger the transceiver to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

All the different base stations according to the embodiments of the invention, which schedule data to the terminal can receive the uplink control information transmitted by the terminal, through the PUCCHs or PUSCHs over the only one uplink carrier over which the terminal transmits the uplink control information, so that the different base stations can obtain in a timely manner ACK/NACK, CSI and other feedback information corresponding to the downlink carriers scheduled by the respective base stations, and schedule and retransmit based upon the feedback information corresponding to the respective base stations, thus improving the throughput and efficiency of the system.

BRIEF DESCRIPTION OF THE DRAWINGS

FIG. 3 is a schematic diagram of a third approach in which data of a terminal are scheduled and transmitted in the dual connectivity scenario in the prior art;

FIG. 4 is a schematic diagram of a method for transmitting feedback information according to an embodiment of the invention;

FIG. 5 is a schematic diagram of a method for receiving feedback information according to an embodiment of the invention;

FIG. 6 is a schematic diagram of a first embodiment of the invention;

DETAILED DESCRIPTION OF THE EMBODIMENTS

Figure 1:
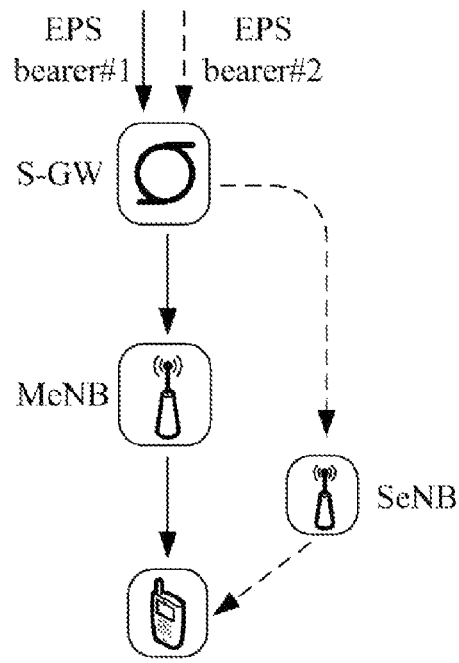
FIG. 1 is a schematic diagram of a first approach in which data of a terminal are scheduled and transmitted in the dual connectivity scenario in the prior art.
Figure 2:
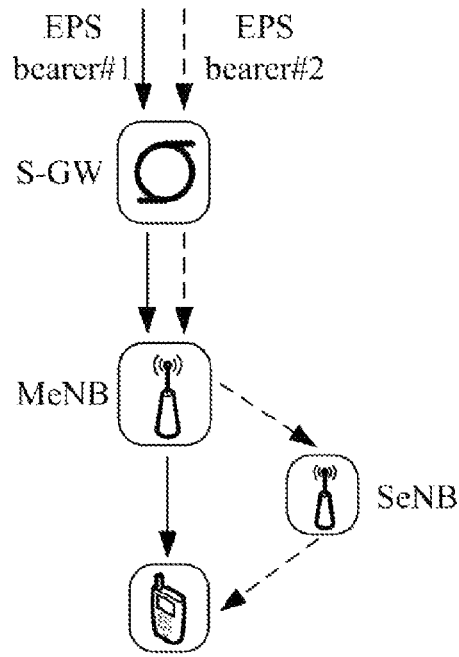
FIG. 2 is a schematic diagram of a second approach in which data of a terminal are scheduled and transmitted in the dual connectivity scenario in the prior art.

Since a terminal operating in the dual connectivity scenario above transmits uplink data over only one uplink carrier, the terminal will feed back uplink control information (including ACK/NACK feedback information, CSI feedback information, SR information, etc.) corresponding to downlink carriers scheduled respectively by a plurality of base stations to the respective base stations over the one uplink carrier. Since downlink data transmitted by the respective base stations to the terminal are scheduled separately by the respective base stations, the different base stations will obtain the feedback information for the downlink data scheduled by the base stations respectively to thereby determine whether to retransmit the downlink data scheduled by the respective base stations. If all the feedback information transmitted by the terminal is received by one of the base stations, then the other base stations will obtain their corresponding feedback information by communicating with the base station, and if communication between the respective base stations is over a non-ideal backhaul, that is, if there is a significant transmission delay between the base stations, then the other base stations may further determine whether the base station will retransmit the scheduled downlink data, only after a long period of communication, thus degrading the throughput and efficiency of the system, so there is a need of a more working solution to transmission by the terminal of the feedback information corresponding to the downlink data scheduled by the respective base stations over the only one uplink carrier so that the different serving base stations can obtain the feedback information for the downlink data scheduled by the respective base stations concurrently.

Hereupon embodiments of the invention provide a method and device for transmitting feedback information (i.e., uplink control information) corresponding to downlink carriers scheduled by respective base stations scheduling data to a terminal in the dual connectivity scenario.

In the embodiments of the invention, in order to describe the technical solutions of the invention, the terms "first". "second", etc., are used to distinguish between the different base stations scheduling data to the UE, and between the downlink carriers scheduled by the different base stations without any limitation upon the numbers and operating priorities of the base stations and the downlink carriers.

For example, if a first base station refers to a Master evolved NodeB (MeNB) of the UE, then a second base station can refer to a Secondary evolved NodeB (SeNB) of the UE, or can refer to all the SeNBs of the UE.

In an embodiment of the invention, the first base station and the second base station can be particularly as follows:

The first base station is an MeNB, and the second base station is an SeNB; or

The first base station is an SeNB, and the second base station is an MeNB; or

The first base station is a base station of a macro cell, and the second base station is a base station of a small cell; or The first base station is a base station of a small cell, and the second base station is a base station of a macro cell; or The first base station is a base station serving a Primary Component Carrier (PCC) of the UE, and the second base station is a base station serving at least one Secondary Component Carrier (SCC) of the UE.

It shall be noted that the first base station includes at least one base station scheduling data to the UE; and the second base station is another base station than the first base station, and the second base station includes at least one base station scheduling data to the terminal.

In the embodiments of the invention, a first carrier refers to a downlink carrier scheduled by the first base station for the terminal, and the first carrier can refer to a set of all the downlink carriers scheduled by the first base station, or can refer to a set of a part of the downlink carriers scheduled by the first base station, or can refer to any one of the downlink carriers scheduled by the first base station; and a second carrier refers to a downlink carrier scheduled by the second base station for the terminal, and the second carrier can refer to a set of all the downlink carriers scheduled by the second base station, or can refer to a set of a part of the downlink carriers scheduled by the second base station, or can refer to any one of the downlink carriers scheduled by the second base station.

Particularly the first carrier and the second carrier may operate at the same frequency or different frequencies.

In the embodiments of the invention, the uplink control information includes but will not be limited to any one of the following information:

Acknowledgment (ACK)/Negative Acknowledgement (NACK) feedback information, Channel State Information (CSI) feedback information, and a Scheduling Request (SR);

Particularly the CSI feedback information includes but will not be limited to at least one of the following information:

A Channel Quality Indicator (CQI), a Precoding Matrix Indicator (PMI), a Rank Indication (RI), and a Preceding Type Indicator (PTI).

In the embodiments of the invention, the first uplink control information refers to uplink control information generated by the terminal for the first carrier, and the second uplink control information refers to uplink control information generated by the terminal for the second carrier.

Referring to FIG. 4, an embodiment of the invention provides a method for transmitting feedback information, which is applicable to a dual connectivity scenario, the method including the following operations:

In the operation 41, a terminal receives data over a first carrier, and receives data over a second carrier, where the data over the first carrier are scheduled by a first base station, and the data over the second carrier are scheduled by a second base station.

In this operation, execution sequence of the operation of the terminal receiving the data over the first or second carrier and the operation of receiving the data over the second or first carrier will not be limited.

In this operation, the terminal receives data over the first carrier so that the terminal receives data scheduled by the first base station over the first carrier, or the terminal does not receive any data over the first carrier; and Alike the terminal receives data over the second carrier so that the terminal receives data scheduled by the second base station over the second carrier, or the terminal does not receive any data over the second carrier.

In the operation 42, the terminal generates first uplink control information for the first carrier, and/or the terminal generates second uplink control information for the second carrier.

Particularly in this operation, the terminal generating the first uplink control information for the first carrier refers to the terminal generating for the first carrier uplink control information corresponding to the first carrier, and the terminal generating the second uplink control information for the second carrier refers to the terminal generating for the second carrier uplink control information corresponding to the second carrier.

In this operation, if the terminal transmits the uplink control information generated by the terminal over the same uplink channel in the same uplink sub-frame over the uplink carrier, then the terminal needs to generate the first uplink control information for the first carrier, and generate the second uplink control information for the second carrier, regardless of whether the terminal receives data over the first carrier and the second carrier, where if the terminal does not receive any data over the first carrier or the second carrier, then the terminal will transmit the uplink control information corresponding to the first carrier or the second carrier as NACK/Discontinuous Transmission (DTX) (or other indication information indicating that no data is received on the downlink carrier);

Otherwise, that is, if the terminal transmits the uplink control information generated by the terminal over different uplink channels over the uplink carrier, then the terminal will generate corresponding uplink control information only for downlink carriers for which uplink control information needs to be transmitted in the current uplink sub-frame. Particularly:

If the uplink control information to be transmitted includes ACK/NACK feedback information, then:

If the terminal receives data only in downlink sub-frames, over the first carrier, for which feedback needs to be made in the current uplink sub-frame, then the terminal will generate only the first uplink control information in the current uplink sub-frame without generating the second uplink control information for the second carrier; if the terminal receives data only in downlink sub-frames, over the second carrier, for which feedback needs to be made in the current uplink sub-frame, then the terminal will generate only the second uplink control information in the current uplink sub-frame without generating the first uplink control information for the first carrier; and if the terminal receives data in downlink sub-frames, over both the first carrier and the second carrier, for which feedback needs to be made in the current uplink sub-frame, then the terminal will generate the first uplink control information and the second uplink control information in the current uplink sub-frame; and If the uplink control information to be transmitted includes CSI feedback information, then:

If the current uplink sub-frame is only a periodical CSI feedback sub-frame corresponding to the first carrier, then the terminal will generate only the first uplink control information in the current uplink sub-frame without generating the second uplink control information for the second carrier; if the current uplink sub-frame is only a periodical CSI feedback sub-frame corresponding to the second carrier, then the terminal will generate only the second uplink control information in the current uplink sub-frame without generating the first uplink control information for the first carrier; and if the current uplink sub-frame is a periodical CSI feedback sub-frame corresponding to both the first carrier and the second carrier, then the terminal will generate the first uplink control information and the second uplink control information in the current uplink sub-frame.

In the operation 43, the terminal transmits the uplink control information generated by the terminal, including at least one of the first uplink control information and the second uplink control information, through a Physical Uplink Control Channel (PUCCH) and/or a Physical Uplink Shared Channel (PUSCH) over one uplink carrier.

Particularly if the terminal generates the first uplink control information only for the first carrier in the operation 42, then the terminal will only transmit the first uplink control information over the one uplink carrier in this operation; if the terminal generates the second uplink control information only for the second carrier in the operation 42, then the terminal will only transmit the second uplink control information over the one uplink carrier in this operation; and if the terminal generates the first uplink control information and the second uplink control information respectively for the first carrier and the second carrier in the operation 42, then the terminal will transmit the first uplink control information and the second uplink control information over the one uplink carrier in this operation.

In the embodiment of the invention, the terminal transmitting in the only one carrier in the uplink can feed back in a timely manner the uplink control information corresponding to the downlink carriers scheduled by the different base stations so that the different base stations can obtain in a timely manner the ACK/NACK, CSI and other feedback information corresponding to the downlink carriers scheduled by the respective base stations, and perform scheduling and retransmitting based upon the feedback information corresponding to the respective base stations, thus improving the throughput and efficiency of the system.

In an embodiment of the invention, the one uplink carrier over which the uplink control information corresponding to the respective base stations scheduling data to the terminal is transmitted in the operation 43 is particularly:

Only one uplink carrier over which uplink data are transmitted, configured by the network side for the terminal; or predefined or pre-configured one of a plurality of uplink carriers over which uplink data are transmitted, configured by the network side for the terminal; or an uplink primary carrier of the terminal.

It shall be noted that a network-side device configuring the terminal with the uplink carrier or carriers over which uplink data are transmitted can be the first base station or can be another base station than the first base station or can be a network-side device which is not a base station.

In an implementation, the terminal transmits the uplink control information generated by the terminal through a PUCCH and/or a PUSCH over the one uplink carrier in the operation 43 particularly in the following three preferred approaches:

In a first approach, the terminal transmits the first uplink control information and the second uplink control information concurrently through the same PUCCH or PUSCH over the one uplink carrier;

In this approach, in an implementation, the terminal transmits the first uplink control information and the second uplink control information concurrently through the same PUCCH over the one uplink carrier particularly as follows in a preferred implementation:

The terminal cascades the first uplink control information and the second uplink control information in a predefined cascade scheme; and The terminal transmits the cascaded uplink control information in the same PUCCH over the one uplink carrier.

In this approach, in an implementation, if there is PUSCH transmission of the terminal, scheduled by the first base station and the second base station over the one uplink carrier, then the terminal will transmit the first uplink control information and the second uplink control information concurrently through the same PUSCH over the one uplink carrier particularly as follows in another preferred implementation:

The terminal cascades the first uplink control information and the second uplink control information in a predefined cascade scheme; and The terminal transmits the cascaded uplink control information in the same PUSCH over the one uplink carrier.

In an embodiment of the invention, the predefined cascade scheme includes but will not be limited to one of the following schemes:

a sequentially cascade scheme, an interleaving cascade scheme in an odd-even order.

For the first approach, the terminal generates the first uplink control information and the second uplink control information, and further cascades the first uplink control information and the second uplink control information in the predefined cascade scheme in the following three schemes dependent upon different contents of the uplink control information:

In a scheme A, if the uplink control information includes only ACK/NACK feedback information, then the terminal will cascade the first uplink control information and the second uplink control information in the predefined cascade scheme particularly as follows:

The terminal generates ACK/NACK for downlink sub-frames in which data are received over the first carrier, and generates NACK/Discontinuous Transmission (DTX) for downlink sub-frames in which no data are received over the first carrier, as ACK/NACK feedback information corresponding to the first carrier, where if there is no data received over the first carrier, then the terminal take generate NACK/Discontinuous Transmission (DTX) (i.e., NACK and/or DTX) as ACK/NACK feedback information corresponding to the first carrier; and The terminal generates ACK/NACK for downlink sub-frames in which data are received over the second carrier, and generates NACK/DTX for downlink sub-frames in which no data are received over the second carrier, as ACK/NACK feedback information corresponding to the second carrier, where if there is no data received over the second carrier, then the terminal will take NACK/DTX as ACK/NACK feedback information corresponding to the second carrier.

Furthermore the terminal cascades the ACK/NACK feedback information corresponding to the first carrier, and the ACK/NACK feedback information corresponding to the second carrier in a predefined cascade scheme, and transmits the cascaded ACK/NACK feedback information through one PUCCH or PUSCH over the one uplink carrier.

In a scheme B, if the uplink control information includes only CSI feedback information, then the terminal will generate the first uplink control information and the second uplink control information, and cascades the first uplink control information and the second uplink control information in the predefined cascade scheme particularly as follows:

The terminal determines CSI feedback information corresponding to the first carrier according to a CSI configuration corresponding to the first carrier (the CSI configuration refers to a CSI feedback periodicity, a CSI feedback mode and other parameters pre-configured by the first base station or the second base station for the downlink carriers scheduled by the base station so that the terminal can determine from these parameters which CSI feedback information to be transmitted in which sub-frames), and the terminal determines CSI feedback information corresponding to the second carrier according to a CSI configuration corresponding to the second carrier.

Furthermore the terminal cascades the CSI feedback information corresponding to the first carrier, and the CSI feedback information corresponding to the second carrier in a predefined cascade scheme, and transmits the cascaded CSI feedback information through one PUCCH or PUSCH over the one uplink carrier.

In a scheme C, if the uplink control information includes ACK/NACK feedback information and CSI feedback information, then the terminal will generate the first uplink control information and the second uplink control information, and cascades the first uplink control information and the second uplink control information in the predefined cascade scheme particularly as follows:

The terminal generates corresponding ACK/NACK feedback information and CSI feedback information respectively for the first carrier and the second carrier in the above scheme A and scheme B.

Particularly the terminal cascades the ACK/NACK feedback information corresponding to the first carrier, and the ACK/NACK feedback information corresponding to the second carrier in the scheme A, and cascades the CSI feedback information corresponding to the first carrier, and the CSI information corresponding to the second carrier in the scheme B, respectively in a predefined cascade scheme, and transmits the cascaded ACK/NACK feedback information and CSI feedback information through one PUCCH or PUSCH over the one uplink carrier.

Furthermore in the scheme C, the ACK/NACK feedback information and the CSI feedback information corresponding to the same base station can correspond respectively to different carriers scheduled by the base station, or can correspond to the same carrier.

Particularly the ACK/NACK feedback information and the CSI feedback information corresponding to the first base station can correspond respectively to different downlink carriers among the downlink carriers scheduled by the first base station, or can correspond to the same one of the downlink carriers scheduled by the first base station; and The ACK/NACK feedback information and the CSI feedback information corresponding to the second base station can correspond respectively to different downlink carriers among the downlink carriers scheduled by the second base station, or can correspond to the same one of the downlink carriers scheduled by the second base station.

In an implementation, for the first approach, in the operation 43, before the terminal transmits the uplink control information through a PUCCH and/or a PUSCH over the one uplink carrier, the method further includes:

The terminal determines a PUCCH resource over which the uplink control information generated by the terminal is to be transmitted, according to received configuration information transmitted by the first base station in higher-layer signaling.

Particularly if the uplink control information generated by the terminal includes only ACK/NACK feedback information, then the PUCCH resource configured by the first base station for the terminal will be a PUCCH resource corresponding to a PUCCH format in which ACK/NACK feedback information is transmitted, as specified in the $3^{rd}$ Generation Partnership (3GPP) standard, e.g., the PUCCH format 1/1a/1b/3:

If the uplink control information generated by the terminal includes only CSI feedback information, then the PUCCH resource configured by the first base station for the terminal will be a PUCCH resource corresponding to a PUCCH format in which CSI feedback information is transmitted, as specified in the 3GPP standard, e.g., the PUCCH format 2/2a/2b; and If the uplink control information generated by the terminal includes both ACK/NACK feedback information and CSI feedback information, then the PUCCH resource configured by the first base station for the terminal will be a PUCCH resource corresponding to a PUCCH format in which ACK/NACK feedback information and CSI feedback information is transmitted concurrently, as specified in the 3GPP standard, e.g., the PUCCH format 3.

It shall be noted that if the PUCCH is transmitted via a single antenna port, then one PUCCH resource will be configured, and if the PUCCH is transmitted via two antenna ports enabled with Spatial Orthogonal Resource Transmit Diversity (SORTD), then two PUCCH resources corresponding respectively to the different antenna ports will be configured.

Preferably the higher-layer signaling can be Radio Resource Control (RRC) signaling or Media Access Control (MAC) signaling.

The first approach above will be equally applicable to a plurality of base stations scheduling data to the terminal, where the terminal transmits uplink control information generated for downlink carriers scheduled by the base stations, concurrently through the same PUCCH or PUSCH over the one uplink carrier.

In a second approach, the terminal transmits the first uplink control information through a first PUCCH using a first PUCCH resource over the one uplink carrier and/or the terminal transmits the second uplink control information through a second PUCCH of a second PUCCH resource over the one uplink carrier, where the first PUCCH resource and the second PUCCH resource are different PUCCH resources.

For the second approach, it can be further performed in the following three schemes dependent upon the different contents included in the uplink control information:

In a first scheme, if the uplink control information includes ACK/NACK feedback information, then:

1. If the terminal receives data over the first carrier and does not receive any data over the second carrier, then a particular process will be performed as follows:

The terminal generates ACK/NACK for downlink sub-frames in which data are received over the first carrier, and generates NACK/DTX for downlink sub-frames in which no data are received over the first carrier, as ACK/NACK feedback information corresponding to the first carrier; and the terminal does not generate ACK/NACK feedback information for the second carrier.

Furthermore the terminal only transmits the ACK/NACK feedback information corresponding to the first carrier through the first PUCCH of the first PUCCH resource over the one uplink carrier.

2. If the terminal does not receive any data over the first carrier and receives data over the second carrier, then a particular process will be performed as follows:

The terminal does not generate ACK/NACK feedback information for the first carrier; and the terminal generates ACK/NACK for downlink sub-frames in which data are received over the second carrier, and generates NACK/DTX for downlink sub-frames in which no data are received over the second carrier, as ACK/NACK feedback information corresponding to the second carrier.

Furthermore the terminal only transmits the ACK/NACK feedback information corresponding to the second carrier through the second PUCCH of the second PUCCH resource over the one uplink carrier.

3. If the terminal receives data over the first carrier, and also receives data over the second carrier, then a particular process will be performed as follows:

The terminal generates ACK/NACK for downlink sub-frames in which data are received over the first carrier, and generates NACK/DTX for downlink sub-frames in which no data are received over the first carrier, as ACK/NACK feedback information corresponding to the first carrier; and the terminal generates ACK/NACK for downlink sub-frames in which data are received over the second carrier, and generates NACK/DTX for downlink sub-frames in which no data are received over the second carrier, as ACK/NACK feedback information corresponding to the second carrier.

Furthermore the terminal transmits the ACK/NACK feedback information corresponding to the first carrier through the first PUCCH of the first PUCCH resource, and transmits the ACK/NACK feedback information corresponding to the second carrier through the second PUCCH of the second PUCCH resource, over the one uplink carrier, where the first PUCCH resource and the second PUCCH resource are different PUCCH resources.

In a second scheme, if the uplink control information only includes CSI feedback information, then:

1. If the terminal only needs to feed back CSI feedback information of the first carrier in the current uplink sub-frame, then a particular process will be performed as follows:

The terminal generates CSI feedback information corresponding to the first carrier according to a CSI configuration corresponding to the first carrier; and the terminal does not generate CSI feedback information for the second carrier.

Furthermore the terminal only transmits the CSI feedback information corresponding to the first carrier through the first PUCCH of the first PUCCH resource over the one uplink carrier.

2. If the terminal only needs to feed back CSI feedback information of the second carrier in the current uplink sub-frame, then a particular process will be performed as follows:

The terminal does not generate CSI feedback information for the first carrier; and the terminal generates CSI feedback information corresponding to the second carrier according to a CSI configuration corresponding to the second carrier.

Furthermore the terminal only transmits the CSI feedback information corresponding to the second carrier through the second PUCCH of the second PUCCH resource over the one uplink carrier.

3. If the terminal needs to feed back both CSI feedback information of the first carrier, and CSI feedback information of the second carrier in the current uplink sub-frame, then a particular process will be performed as follows:

The terminal generates CSI feedback information corresponding to the first carrier according to a CSI configuration corresponding to the first carrier; and the terminal generates CSI feedback information corresponding to the second carrier according to a CSI configuration corresponding to the second carrier.

Furthermore the terminal transmits the CSI feedback information corresponding to the first carrier through the first PUCCH of the first PUCCH resource, and transmits the CSI feedback information corresponding to the second carrier through the second PUCCH of the second PUCCH resource, respectively over the one uplink carrier.

In a third scheme, if the uplink control information includes ACK/NACK feedback information and CSI feedback information, then:

The terminal generates corresponding ACK/NACK feedback information and CSI feedback information respectively for the first carrier and the second carrier in the first scheme and the second scheme.

Furthermore the terminal transmits the ACK/NACK feedback information and the CSI feedback information corresponding to the first carrier through the first PUCCH of the first PUCCH resource, and transmits the ACK/NACK feedback information and the CSI feedback information corresponding to the second carrier through the second PUCCH of the second PUCCH resource over the one uplink carrier, respectively over the one uplink carrier.

Furthermore in the third scheme, the ACK/NACK feedback information and the CSI feedback information corresponding to the same base station can correspond respectively to different carriers scheduled by the base station, or can correspond to the same carrier.

Particularly the ACK/NACK feedback information and the CSI feedback information corresponding to the first base station can correspond respectively to different downlink carriers among the downlink carriers scheduled by the first base station, or can correspond to the same one of the downlink carriers scheduled by the first base station, and The ACK/NACK feedback information and the CSI feedback information corresponding to the second base station can correspond respectively to different downlink carriers among the downlink carriers scheduled by the second base station, or can correspond to the same one of the downlink carriers scheduled by the second base station.

In the second approach above, the terminal transmits the first uplink control information through the PUCCH of the first PUCCH resource over the one uplink carrier regardless of whether there is a first PUSCH of the terminal, scheduled by the first of the base station, over the one uplink carrier; and the terminal transmits the second uplink control information through the PUCCH of the second PUCCH resource over the one uplink carrier regardless of whether there is a second PUSCH of the terminal, scheduled by the second base station over the one uplink carrier.

The second approach above will be equally applicable to a plurality of base stations scheduling data to the terminal, where the terminal transmits uplink control information generated for downlink carriers scheduled by the plurality of base stations, concurrently through PUCCHs of different PUCCH resources over the one uplink carrier.

In a third approach, if there is a first PUSCH of the terminal, scheduled by the first base station over the one uplink carrier, then in order to save resources, the terminal will transmit the first uplink control information through the first PUSCH; otherwise, the terminal will transmit the first uplink control information through a first PUCCH using a first PUCCH resource over the one uplink carrier, where the first PUCCH resource and the second PUCCH resource are different PUCCH resources:

And/or

If there is a second PUSCH of the terminal, scheduled by the second base station over the one uplink carrier, then in order to save resources, the terminal will transmit the second uplink control information through the second PUSCH; otherwise, the terminal will transmit the second uplink control information through a second PUCCH of a second PUCCH resource over the one uplink carrier, where the first PUCCH resource and the second PUCCH resource are different PUCCH resources.

For the third approach, it can be performed in the following three schemes dependent upon different contents of the uplink control information:

In a first scheme, if the uplink control information includes ACK/NACK feedback information, then:

1. If the terminal receives data over the first carrier and does not receive any data over the second carrier, then a particular process will be performed as follows:

The terminal generates ACK/NACK for downlink sub-frames in which data are received over the first carrier, and generates NACK/DTX for downlink sub-frames in which no data are received over the first carrier, as ACK/NACK feedback information corresponding to the first carrier; and the terminal does not generate ACK/NACK feedback information for the second carrier.

Furthermore if there is the first PUSCH of the terminal, scheduled by the first base station over the one uplink carrier, then the terminal will transmit the ACK/NACK feedback information corresponding to the first carrier through the first PUSCH over the one uplink carrier to thereby save a resource; otherwise, the terminal will transmit the ACK/NACK feedback information corresponding to the first carrier through the first PUCCH of the first PUCCH resource over the one uplink carrier.

2. If the terminal does not receive any data over the first carrier and receives data over the second carrier, then a particular process will be performed as follows:

The terminal does not generate ACK/NACK feedback information for the first carrier; and the terminal generates ACK/NACK for downlink sub-frames in which data are received over the second carrier, and generates NACK/DTX for downlink sub-frames in which no data are received over the second carrier, as ACK/NACK feedback information corresponding to the second carrier.

Furthermore if there is the second PUSCH of the terminal, scheduled by the second base station over the one uplink carrier, then the terminal will transmit the ACK/NACK feedback information corresponding to the second carrier through the second PUSCH over the one uplink carrier to thereby save a resource; otherwise, the terminal will transmit the ACK/NACK feedback information corresponding to the second carrier through the second PUCCH of the second PUCCH resource over the one uplink carrier.

3. If the terminal receives data over the first carrier, and also receives data over the second carrier, then a particular process will be performed as follows:

The terminal generates ACK/NACK for downlink sub-frames in which data are received over the first carrier, and generates NACK/DTX for downlink sub-frames in which no data are received over the first carrier, as ACK/NACK feedback information corresponding to the first carrier; and the terminal generates ACK/NACK for downlink sub-frames in which data are received over the second carrier, and generates NACK/DTX for downlink sub-frames in which no data are received over the second carrier, as ACK/NACK feedback information corresponding to the second carrier.

Furthermore if there is the first PUSCH of the terminal, scheduled by the first base station over the one uplink carrier, and there is the second PUSCH of the terminal, scheduled by the second base station over the one uplink carrier, then the terminal will transmit the ACK/NACK feedback information corresponding to the first carrier through the first PUSCH, and transmit the ACK/NACK feedback information corresponding to the second carrier through the second PUSCH, respectively over the one uplink carrier;

If there is the first PUSCH of the terminal, scheduled by the first base station over the one uplink carrier, and there is no the second PUSCH of the terminal, scheduled by the second base station over the one uplink carrier, then the terminal will transmit the ACK/NACK feedback information corresponding to the first carrier through the first PUSCH, and transmit the ACK/NACK feedback information corresponding to the second carrier through the second PUCCH of the second PUCCH resource, over the one uplink carrier;

If there is no the first PUSCH of the terminal, scheduled by the first base station over the one uplink carrier, and there is the second PUSCH of the terminal, scheduled by the second base station over the one uplink carrier, then the terminal will transmit the ACK/NACK feedback information corresponding to the first carrier through the first PUCCH of the first PUCCH resource, and transmit the ACK/NACK feedback information corresponding to the second carrier through the second PUSCH, over the one uplink carrier; and If there is no the first PUSCH of the terminal, scheduled by the first base station over the one uplink carrier, and there is no the second PUSCH of the terminal, scheduled by the second base station over the one uplink carrier, then the terminal will transmit the ACK/NACK feedback information corresponding to the first carrier through the first PUCCH of the first PUCCH resource, and transmit the ACK/NACK feedback information corresponding to the second carrier through the second PUCCH of the second PUCCH resource, over the one uplink carrier, where the first PUCCH resource and the second PUCCH resource are different PUCCH resources.

In a second scheme, if the uplink control information includes only CSI feedback information, then:

1. If the terminal only needs to feed back CSI feedback information of the first carrier in the current uplink sub-frame, then a particular process will be performed as follows:

The terminal generates CSI feedback information corresponding to the first carrier according to a CSI configuration corresponding to the first carrier; and the terminal does not generate CSI feedback information for the second carrier.

Furthermore if there is the first PUSCH of the terminal, scheduled by the first base station over the one uplink carrier, then the terminal will transmit the CSI feedback information corresponding to the first carrier through the first PUSCH over the one uplink carrier to thereby save a resource; otherwise, the terminal will transmit the CSI feedback information corresponding to the first carrier through the first PUCCH of the first PUCCH resource over the one uplink carrier.

2. If the terminal only needs to feed back CSI feedback information of the second carrier in the current uplink sub-frame, then a particular process will be performed as follows:

The terminal does not generate CSI feedback information for the first carrier; and the terminal generates CSI feedback information corresponding to the second carrier according to a CSI configuration corresponding to the second carrier.

Furthermore if there is the second PUSCH of the terminal, scheduled by the second base station over the one uplink carrier, then the terminal will transmit the CSI feedback information corresponding to the second carrier through the second PUSCH over the one uplink carrier to thereby save a resource; otherwise, the terminal will transmit the CSI feedback information corresponding to the second carrier through the second PUCCH of the second PUCCH resource over the one uplink carrier.

3. If the terminal needs to feed back both CSI feedback information of the first carrier, and CSI feedback information of the second carrier in the current uplink sub-frame, then a particular process will be performed as follows:

The terminal generates CSI feedback information corresponding to the first carrier according to a CSI configuration corresponding to the first carrier; and the terminal generates CSI feedback information corresponding to the second carrier according to a CSI configuration corresponding to the second carrier.

Furthermore if there is the first PUSCH of the terminal, scheduled by the first base station over the one uplink carrier, and there is the second PUSCH of the terminal, scheduled by the second base station over the one uplink carrier, then the terminal will transmit the CSI feedback information corresponding to the first carrier through the first PUSCH, and transmit the CSI feedback information corresponding to the second carrier through the second PUSCH, respectively over the one uplink carrier:

If there is the first PUSCH of the terminal, scheduled by the first base station over the one uplink carrier, and there is no the second PUSCH of the terminal, scheduled by the second base station over the one uplink carrier, then the terminal will transmit the CSI feedback information corresponding to the first carrier through the first PUSCH, and transmit the CSI feedback information corresponding to the second carrier through the second PUCCH of the second PUCCH resource, over the one uplink carrier;

If there is no the first PUSCH of the terminal, scheduled by the first base station over the one uplink carrier, and there is the second PUSCH of the terminal, scheduled by the second base station over the one uplink carrier, then the terminal will transmit the CSI feedback information corresponding to the first carrier through the first PUCCH of the first PUCCH resource, and transmit the CSI feedback information corresponding to the second carrier through the second PUSCH, over the one uplink carrier; and If there is no the first PUSCH of the terminal, scheduled by the first base station over the one uplink carrier, and there is no the second PUSCH of the terminal, scheduled by the second base station over the one uplink carrier, then the terminal will transmit the CSI feedback information corresponding to the first carrier through the first PUCCH of the first PUCCH resource, and transmit the CSI feedback information corresponding to the second carrier through the second PUCCH of the second PUCCH resource, over the one uplink carrier, where the first PUCCH resource and the second PUCCH resource are different PUCCH resources.

In a third scheme, if the uplink control information includes ACK/NACK feedback information and CSI feedback information, then:

The terminal generates corresponding ACK/NACK feedback information and CSI feedback information respectively for the first carrier and the second carrier in the first scheme and the second scheme.

Furthermore if there is the first PUSCH of the terminal, scheduled by the first base station over the one uplink carrier, and there is the second PUSCH of the terminal, scheduled by the second base station over the one uplink carrier, then the terminal will transmit the ACK/NACK feedback information and the CSI feedback information corresponding to the first carrier through the first PUSCH, and transmit the ACK/NACK feedback information and the CSI feedback information corresponding to the second carrier through the second PUSCH, respectively over the one uplink carrier;

If there is the first PUSCH of the terminal, scheduled by the first base station over the one uplink carrier, and there is no the second PUSCH of the terminal, scheduled by the second base station over the one uplink carrier, then the terminal will transmit the ACK/NACK feedback information and the CSI feedback information corresponding to the first carrier through the first PUSCH, and transmit the ACK/NACK feedback information and the CSI feedback information corresponding to the second carrier through the second PUCCH of the second PUCCH resource, over the one uplink carrier;

If there is no the first PUSCH of the terminal, scheduled by the first base station over the one uplink carrier, and there is the second PUSCH of the terminal, scheduled by the second base station over the one uplink carrier, then the terminal will transmit the ACK/NACK feedback information and the CSI feedback information corresponding to the first carrier through the first PUCCH of the first PUCCH resource, and transmit the ACK/NACK feedback information and the CSI feedback information corresponding to the second carrier through the second PUSCH, over the one uplink carrier; and If there is no the first PUSCH of the terminal, scheduled by the first base station over the one uplink carrier, and there is no the second PUSCH of the terminal, scheduled by the second base station over the one uplink carrier, then the terminal will transmit the ACK/NACK feedback information and the CSI feedback information corresponding to the first carrier through the first PUCCH of the first PUCCH resource, and transmit the ACK/NACK feedback information and the CSI feedback information corresponding to the second carrier through the second PUCCH of the second PUCCH resource, over the one uplink carrier, where the first PUCCH resource and the second PUCCH resource are different PUCCH resources.

Furthermore in the third scheme, the ACK/NACK feedback information and the CSI feedback information corresponding to the same base station can correspond respectively to different carriers scheduled by the base station, or can correspond to the same carrier.

Particularly the ACK/NACK feedback information and the CSI feedback information corresponding to the first base station can correspond respectively to different downlink carriers among the downlink carriers scheduled by the first base station, or can correspond to the same one of the downlink carriers scheduled by the first base station; and The ACK/NACK feedback information and the CSI feedback information corresponding to the second base station can correspond respectively to different downlink carriers among the downlink carriers scheduled by the second base station, or can correspond to the same one of the downlink carriers scheduled by the second base station.

The third approach above will be equally applicable to a plurality of base station scheduling data to the terminal, where the terminal transmits uplink control information generated for downlink carriers scheduled by the plurality of base stations, concurrently through PUSCHs scheduled by the different base stations or PUCCHs of different PUCCH resources over the one uplink carrier.

In the second approach and the third approach, the terminal obtains the resources over which the uplink control information is transmitted, over the one uplink carrier particularly as follows:

1. If the uplink control information includes ACK/NACK feedback information, then before the terminal transmits the uplink control information through a PUCCH and/or a PUSCH over the one uplink carrier, the method further includes:

The terminal determines the first PUCCH resource for the first PUCCH according to received configuration information transmitted by the first base station in higher-layer signaling; or the terminal determines at least one of a plurality of PUCCH resources pre-configured by the first base station for the terminal, as the first PUCCH resource according to an ACK/NACK Resource Indicator (ARI) in a received Physical Downlink Control Channel (PDCCH) or Enhanced PDCCH (EPDCCH) transmitted by the first base station:

And/or

The terminal determines the second PUCCH resource for the second PUCCH according to received configuration information transmitted by the first base station; or the terminal determines the second PUCCH resource for the second PUCCH according to received configuration information transmitted by the second base station; or the terminal determines the second PUCCH resource for the second PUCCH according to an ARI in a received PDCCH or EPDCCH transmitted by the second base station; where the second PUCCH resource is at least one of all the available PUCCH resources of the second base station which is notified in advance by the first base station.

Particularly both the first PUCCH resource and the second PUCCH resource are PUCCH resources corresponding to a PUCCH format in which ACK/NACK feedback information is transmitted, as specified in the 3GPP standard (e.g., the PUCCH format 1/1a/1b/3), and the first PUCCH resource is different from the second PUCCH resource.

Furthermore the ARI above is particularly:

A fixed bit field in the EPDCCHs transmitted by the first base station and the second base station; or An added bit field in the PDCCHs transmitted by the first base station and the second base station; or A reused Transmit Power Control (TPC) field in all the other PDCCHs transmitted by the first base station than a PDCCH corresponding to a Downlink Assignment Index (DAI)=1 of a PCC if the first base station operates in a Time Division Duplex (TDD) system.

Particularly if the ARI is the reused TPC field in all the other PDCCHs transmitted by the first base station than the PDCCH corresponding to the DAI=1 of the PCC, then the ARI in the PDCCH may be absent, and if the terminal does not receive any PDCCH/EPDCCH with an ARI field in a downlink carrier scheduled by the first base station (for example, the terminal subsequently receives a PDCCH corresponding to the DAI=1 of the PCC, scheduled by the first base station), then the terminal can determine an implicit PUCCH resource to transmit the ACK/NACK feedback information corresponding to the first carrier, according to the lowest Control Channel Element (CCE) index of the received PDCCH.

2. If the uplink control information includes only CSI feedback information, then before the terminal transmits the uplink control information through a PUCCH and/or a PUSCH over the one uplink carrier, the method further includes:

The terminal determines the first PUCCH resource for the first PUCCH according to received configuration information transmitted by the first base station in higher-layer signaling;

And/or

The terminal determines the second PUCCH resource for the second PUCCH according to received configuration information transmitted by the first base station in higher-layer signaling; or the terminal determines the second PUCCH resource for the second PUCCH according to received configuration information transmitted by the second base station; where the second PUCCH resource is at least one of all the available PUCCH resources of the second base station, which are pre-configured by the first base station for the second base station.

Particularly both the first PUCCH resource and the second PUCCH resource are PUCCH resources corresponding to a PUCCH format in which CSI feedback information is transmitted, as specified in the 3GPP standard (e.g., the PUCCH format 2/2a/2b), and the first PUCCH resource is different from the second PUCCH resource.

Preferably the higher-layer signaling above can be RRC signaling or MAC signaling.

3. If the uplink control information includes both ACK/NACK feedback information and CSI feedback information, then the terminal can obtain the first PUCCH resource and/or the second PUCCH resource as in either of the two schemes above to obtain the resources.

Preferably the terminal obtains the first PUCCH resource and/or the second PUCCH resource as in the scheme to obtain the resources for ACK/NACK.

Based upon the embodiments above, an embodiment of the invention further provides a method for receiving feedback information, which is applicable to a dual connectivity scenario, and as illustrated in FIG. 5, the method includes:

Operation 51. A first base station transmits data for a terminal over a first carrier, where the terminal is configured with at least the first carrier and a second carrier; and the data over the first carrier are scheduled by the first base station, and data over the second carrier are scheduled by a second base station; and Operation 52. The first base station receives uplink control information transmitted by the terminal, through a PUCCH or a PUSCH over one uplink carrier, where the one uplink carrier is configured to transmit uplink control information corresponding to the respective base stations scheduling data to the terminal.

In an embodiment of the invention, the one uplink carrier over which the uplink control information corresponding to the respective base station scheduling data to the terminal is transmitted in the operation 52 is particularly:

Only one uplink carrier over which uplink data are transmitted, configured by the network side for the terminal; or predefined or pre-configured one of a plurality of uplink carriers over which uplink data are transmitted, configured by the network side for the terminal; or an uplink primary carrier of the terminal.

In an embodiment of the invention, if the second base station also transmit data for the terminal over the second carrier, then the second base station will also receive uplink control information transmitted by the terminal, over the one uplink carrier, where the uplink control information includes first uplink control information and second uplink control information, and since processing by the second base station is similar to that by the first base station, a repeated description thereof will be omitted here.

In an implementation, the first base station receives the uplink control information transmitted by the terminal, through a PUCCH or a PUSCH over one uplink carrier particularly in the following three preferred approaches:

In a first approach, the first base station receives the uplink control information transmitted by the terminal, including first uplink control information and second uplink control information, through one PUCCH or PUSCH over the one uplink carrier.

In this approach, in an implementation, after the first base station receives the uplink control information transmitted by the terminal, over the one uplink carrier, the method further includes:

The first base station obtains the first uplink control information from the received uplink control information in a predefined cascade scheme.

In an embodiment of the invention, the predefined cascade scheme includes but will not be limited to one of the following schemes:

a sequentially cascade scheme, a interleaving cascade scheme in an odd-even order.

It shall be noted that the second base station receives the uplink control information transmitted by the terminal, in a similar way to the first base station, particularly as follows:

The second base station receives the uplink control information transmitted by the terminal, including the first uplink control information and the second uplink control information, through the same PUCCH or PUSCH (i.e., the same PUCCH or PUSCH over which the first base station receives the uplink control information) over the one uplink carrier; and The second base station obtains the second uplink control information from the received uplink control information in the predefined cascade scheme.

In an implementation, for the first approach, in the operation 52, before the first base station receives the uplink control information transmitted by the terminal, over the one uplink carrier, the method further includes:

The first base station transmits configuration information to the terminal in higher-layer signaling to indicate to the terminal at least one PUCCH resource over which the uplink control information is to be transmitted.

Particularly if the uplink control information generated by the terminal includes only ACK/NACK feedback information, then the PUCCH resource configured by the first base station for the terminal will be a PUCCH resource corresponding to a PUCCH format in which ACK/NACK feedback information is transmitted, as specified in the 3GPP standard, e.g., the PUCCH format 1/1a/1b/3;

If the uplink control information generated by the terminal includes only CSI feedback information, then the PUCCH resource configured by the first base station for the terminal will be a PUCCH resource corresponding to a PUCCH format in which CSI feedback information is transmitted, as specified in the 3GPP standard, e.g., the PUCCH format 2/2a/2b; and If the uplink control information generated by the terminal includes both ACK/NACK feedback information and CSI feedback information, then the PUCCH resource configured by the first base station for the terminal will be a PUCCH resource corresponding to a PUCCH format in which ACK/NACK feedback information and CSI feedback information is transmitted concurrently, as specified in the 3GPP standard, e.g., the PUCCH format 3.

Preferably the higher-layer signaling can be RRC signaling or MAC signaling.

Furthermore in the operation 52, the first base station receives the uplink control information transmitted by the terminal, through the PUCCH resource configured by the first base station for the terminal, over the one uplink carrier.

It shall be noted that in the resource configuration process above, if the PUCCH is transmitted via a single antenna port, then one PUCCH resource will be configured, and if the PUCCH is transmitted via two antenna ports enabled with SORTD, then two PUCCH resources corresponding respectively to the different antenna ports will be configured.

Furthermore the method further includes:

The first base station notifies the second base station of the PUCCH resource configured for the terminal so that the second base station receives the uplink control information transmitted by the terminal, through the PUCCH resource used by the terminal, of which the second base station is notified by the first base station, over the one uplink carrier.

The first approach above will be equally applicable to a plurality of base stations scheduling data to the terminal, where the other base stations than the first base station can receive the uplink control information transmitted by the terminal, through the same PUCCH or PUSCH over the one uplink carrier in the same way as the second base station, so a repeated description thereof will be omitted here.

In a second approach, the first base station receives the uplink control information including only the first uplink control information but no second uplink control information through a first PUCCH using a first PUCCH resource over the one uplink carrier.

It shall be noted that if the second base station transmits data for the terminal over the second carrier, then the second base station will receive the uplink control information transmitted by the terminal in a similar way to the first base station, particularly as follows:

The second base station receives the uplink control information including second uplink control information and no first uplink control information through a second PUCCH of a second PUCCH resource over the one uplink carrier.

In the second approach, the terminal transmits the first uplink control information through the PUCCH of the first PUCCH resource over the one uplink carrier, and accordingly the first base station receives the first uplink control information through the PUCCH of the first PUCCH resource over the one uplink carrier, regardless of whether the first base station schedules a first PUSCH for the terminal over the one uplink carrier; and the terminal transmits the second uplink control information through the PUCCH of the second PUCCH resource over the one uplink carrier, and accordingly the second base station receives the second uplink control information through the PUCCH of the second PUCCH resource over the one uplink carrier, regardless of whether the second base station schedules a second PUSCH for the terminal over the one uplink carrier.

The second approach will be equally applicable to a plurality of base stations scheduling data to the terminal, where the other base stations than the first base station can receive the uplink control information transmitted by the terminal, through the PUCCHs of the different resources over the one uplink carrier in the same way as the second base station, so a repeated description thereof will be omitted here.

In a third approach, if the first base station schedules a first PUSCH over the first carrier, then the first base station will receive the uplink control information transmitted by the terminal, in the first PUSCH to thereby save a resource; otherwise, the first base station will receive the uplink control information through a first PUCCH using a first PUCCH resource over the one uplink carrier, where the uplink control information includes first uplink control information but no second uplink control information.

It shall be noted that if the second base station transmits data for the terminal over the second carrier, then the second base station will receive the uplink control information transmitted by the terminal in a similar way to the first base station, particularly as follows:

if the second base station schedules a second PUSCH over the second carrier, then the second base station will receive the uplink control information transmitted by the terminal, in the second PUSCH to thereby save a resource; otherwise, the second base station will receive the uplink control information through a second PUCCH of a second PUCCH resource over the one uplink carrier, where the uplink control information includes second uplink control information but no first uplink control information.

The third approach will be equally applicable to a plurality of base stations scheduling data to the terminal, where the other base stations than the first base station can receive the uplink control information transmitted by the terminal, through the PUCCHs of the different resources, or the PUSCHs scheduled by the respective base stations, over the one uplink carrier in the same way as the second base station, so a repeated description thereof will be omitted here.

In an implementation, for the second approach and the third approach, the resources over which the terminal transmits the uplink control information over the one uplink carrier can be configured particularly as follows:

1. If the uplink control information includes only ACK/NACK feedback information, then before the first base station receives the uplink control information over the one uplink carrier, the method further includes:

The first base station transmits configuration information to the terminal in higher-layer signaling to indicate the first PUCCH resource for the first PUCCH; or the first base station indicates to the terminal at least one of a plurality of PUCCH resources pre-configured by the first base station for the terminal, as the first PUCCH resource for the first PUCCH in an ARI in a PDCCH or an EPDCCH;

And/or

The first base station transmits configuration information to the terminal in higher-layer signaling to indicate the second PUCCH resource for the second PUCCH; or the first base station notifies in advance of all the PUCCH resources over the one uplink carrier which can be used by the second base station to the second base station so that the second base station configures the terminal with the second PUCCH resource.

Correspondingly the second base station configures the terminal with the second PUCCH resource for the second PUCCH in a similar way to the first base station configuring the terminal with the first PUCCH resource, particularly as follows:

The second base station configures the terminal with any one of all the PUCCH resources available to the second base station over the one uplink carrier, which are pre-configured by the first base station for the second base station, as the second PUCCH resource for the second PUCCH; or The second base station pre-configures the terminal with more than one of all the available PUCCH resources of the second base station over the one uplink carrier, which are pre-configured by the first base station for the second base station, and indicates to the terminal at least one of the PUCCH resources pre-configured by the second base station for the terminal in an ARI in a PDCCH or an EPDCCH, as the second PUCCH resource for the second PUCCH.

Furthermore in the operation 52, the first base station receives the uplink control information transmitted by the terminal, through the first PUCCH of the first PUCCH resource over the one uplink carrier.

Correspondingly the second base station receives the uplink control information transmitted by the terminal, through the second PUCCH of the second PUCCH resource over the one uplink carrier.

It shall be noted that in the resource configuration process above, if the PUCCH is transmitted via a single antenna port, then one PUCCH resource will be configured, and if the PUCCH is transmitted via two antenna ports enabled with SORTD, then two PUCCH resources corresponding respectively to the different antenna ports will be configured.

Furthermore the ARI is particularly:

A fixed bit field in the EPDCCHs transmitted by the first base station and the second base station; or An added bit field in the PDCCHs transmitted by the first base station and the second base station; or A reused TPC field in all the other PDCCHs transmitted by the first base station than a PDCCH corresponding to a Downlink Assignment Index (DAI)=1 of a PCC if the first base station operates in a TDD system.

Particularly if the ARI is the reused TPC field in all the other PDCCHs transmitted by the first base station than the PDCCH corresponding to the DAI=1 of the PCC, then the ARI in the PDCCH may be absent, and if the terminal does not receive any PDCCH/EPDCCH with an ARI field in a downlink carrier scheduled by the first base station (for example, the terminal subsequently receives a PDCCH corresponding to the DAI=1 of the PCC scheduled by the first base station), then the terminal can determine an implicit PUCCH resource over which the ACK/NACK feedback information corresponding to the first carrier is transmitted, according to the lowest CCE index of the received PDCCH.

2. If the uplink control information receives only CSI feedback information, then before the first base station receives the uplink control information over the one uplink carrier, the method further includes:

The first base station transmits configuration information to the terminal in higher-layer signaling to indicate the first PUCCH resource for the first PUCCH;

And/or

The first base station transmits configuration information to the terminal in higher-layer signaling to indicate the second PUCCH resource for the second PUCCH; or the first base station notifies in advance of all the PUCCH resources over the one uplink carrier which can be used by the second base station to the second base station so that the second base station configures the terminal with the second PUCCH resource for the second PUCCH.

Correspondingly the second base station configures the terminal with the second PUCCH resource for the second PUCCH in a similar way to the first base station configuring the terminal with the first PUCCH resource, particularly as follows:

The second base station configures the terminal with any one of all the available PUCCH resources available of the second base station over the one uplink carrier, which are pre-configured by the first base station for the second base station, as the second PUCCH resource for the second PUCCH.

Furthermore in the operation 52, the first base station receives the uplink control information transmitted by the terminal, through the first PUCCH of the first PUCCH resource over the one uplink carrier.

Correspondingly the second base station receives the uplink control information transmitted by the terminal, through the second PUCCH of the second PUCCH resource over the one uplink carrier.

It shall be noted that in the resource configuration process above, if the PUCCH is transmitted via a single antenna port, then one PUCCH resource will be configured, and if the PUCCH is transmitted via two antenna ports enabled with SORTD, then two PUCCH resources corresponding respectively to the different antenna ports will be configured.

Preferably the higher-layer signaling can be RRC signaling or MAC signaling.

3. If the uplink control information includes both ACK/NACK feedback information and CSI feedback information, then the first base station can configure the terminal with the first PUCCH resource and/or the second PUCCH resource as in either of the two schemes above to configure the resources.

Preferably the first base station configure the terminal with the first PUCCH resource and/or the second PUCCH resource as in the scheme to configure the resources for ACK/NACK.

Along with the technical evolvement and emerging data services, the concept of a small cell has been proposed and gained extensive attention. Typically there is a smaller coverage area and lower transmit power of the small cell, and the small cell is deployed in a place closer to a user, e.g., indoor or a hotspot area, so a data rate of the user can be improved. If the terminal is connected with both a base station of the small cell and a base station of a macro cell, that is, the terminal is served by both the base station of the small cell and the base station of the macro cell, which is a typical dual connectivity scenario where the terminal is served concurrently by a plurality of base stations. The terminal can receive downlink services concurrently over different downlink carriers served respectively by the base station of the small cell and the base station of the macro cell, and these downlink services are scheduled separately by the base station of the small cell and the base station of the macro cell respectively.

The method for transmitting feedback information according to the embodiment of the invention will be described below in details in connection with the following three particular embodiments taking the typical dual connectivity scenario above as an example.

In a first embodiment, a user equipment (UE) is connected with both a base station of a macro cell, and a base station of a small cell, and the UE operates only over an uplink carrier 1 in the uplink, and can operate respectively over downlink carriers 1 and 2 scheduled by the macro cell, and downlink carriers 3 and 4 scheduled by the small cell, in the downlink, as illustrated in FIG. 6. In this embodiment, the UE and the respective base stations operate particularly as follows:

At the base station side, the base station of the macro cell schedules downlink data to the UE over the downlink carriers 1 and 2; and the base station of the small cell schedules downlink data to the UE over the downlink carriers 3 and 4:

At the UE side, the UE receives the downlink data respectively over the downlink carriers 1 to 4, and generates corresponding ACK/NACK feedback information for the respective downlink carriers; and transmits the ACK/NACK feedback information corresponding to the downlink carriers 1 to 4 concurrently through one PUCCH over the uplink carrier 1;

Here a resource for the PUCCH is a resource known to the base station of the macro cell, and the base station of the small cell, and particularly can be pre-configured by the base station of the macro cell for the UE, and notified in advance to the base station of the small cell through communication between the base stations; and At the base station side, both the base station of the macro cell, and the base station of the small cell receive the ACK/NACK feedback information through the one PUCCH resource over the uplink carrier 1, and obtain their corresponding ACK/NACK feedback information from the ACK/NACK feedback information carried by the PUCCH in a predefined cascade scheme.

Figure 7:
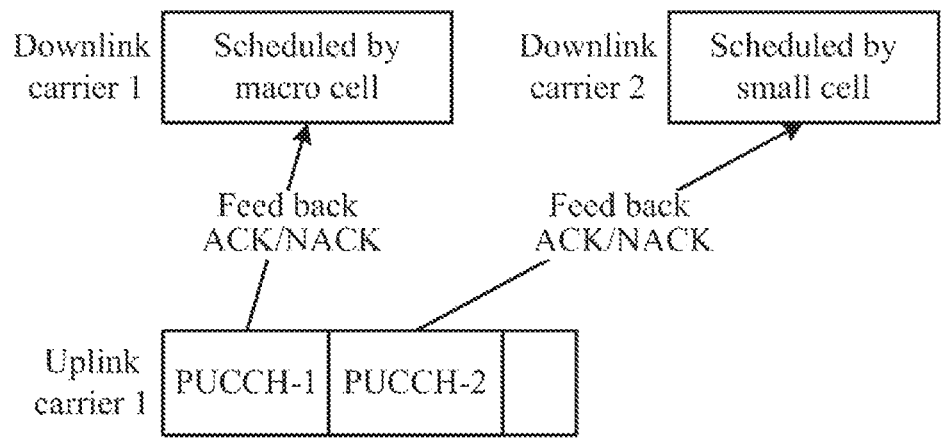
FIG. 7 is a schematic diagram of a second embodiment of the invention.

In a second embodiment, a UE is connected with both a base station of a macro cell, and a base station of a small cell, and the UE operates only over an uplink carrier 1 in the uplink, and can operate respectively over a downlink carrier 1 scheduled by the macro cell, and a downlink carrier 2 scheduled by the small cell, in the downlink, as illustrated in FIG. 7. In this embodiment, the UE and the respective base stations operate particularly as follows:

At the base station side, the base station of the macro cell schedules downlink data to the UE over the downlink carrier 1; and the base station of the small cell schedules downlink data to the UE over the downlink carrier 2;

At the UE side, the UE receives the downlink data respectively over the downlink carriers 1 and 2, and generates corresponding ACK/NACK feedback information for the respective downlink carriers; and transmits the ACK/NACK feedback information corresponding to the downlink carrier 1 through a PUCCH-1 (i.e., a first PUCCH), and transmits the ACK/NACK feedback information corresponding to the downlink carrier 2 through a PUCCH-2 (i.e., a second PUCCH), over the uplink carrier 1;

Here a resource for the PUCCH-1 is a resource known to the base station of the macro cell, and particularly can be pre-configured by the base station of the macro cell for the UE, for example, the macro base station can pre-configure the UE with one fixed resource in higher-layer signaling, or the macro base station can pre-configure the UE with a plurality of resources in higher-layer signaling, and indicate to the UE which ones of the resources as the resource for the PUCCH-1 in an ARI field in a PDCCH/EPDCCH transmitted by the base station of the macro cell; and a resource for the PUCCH-2 is a resource known to the base station of the small cell, and particularly firstly the base station of the macro cell can notify in advance the base station of the small cell of a pool of PUCCH resources over the uplink carrier, which are reserved for the small cell by exchanging information therewith, and then the base station of the small cell can allocate to the UE a resource in its corresponding pool of PUCCH resources reserved over the uplink carrier, where the base station of the small cell can configure the UE with the resource in its corresponding reserved pool of PUCCH resources over the uplink carrier particularly in the same way as the macro cell; and At the base station side, both the base station of the macro cell, and the base station of the small cell receive their respective ACK/NACK feedback information through their corresponding PUCCH resources over the uplink carrier 1.

Figure 8:
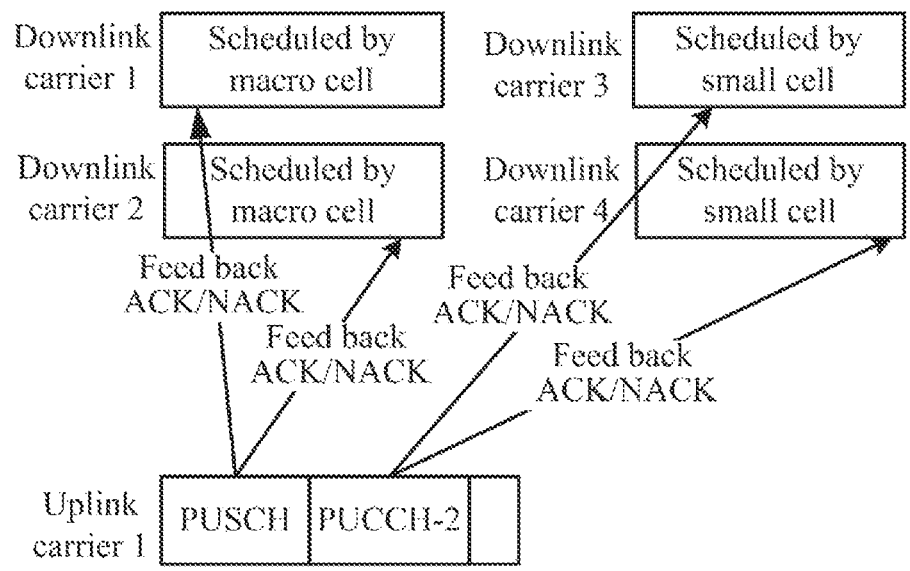
FIG. 8 is a schematic diagram of a third embodiment of the invention.

In a third embodiment, a UE is connected with both a base station of a macro cell, and a base station of a small cell, and the UE operates only over an uplink carrier 1 served by the macro cell in the uplink, and can operate respectively over downlink carriers 1 and 2 scheduled by the macro cell, and downlink carriers 3 and 4 scheduled by the small cell, in the downlink, as illustrated in FIG. 8. In this embodiment, the UE and the respective base stations operate particularly as follows:

At the base station side, the base station of the macro cell schedules downlink data to the UE over the downlink carrier 1 and the downlink carrier 2; the base station of the small cell schedules downlink data to the UE over the downlink carrier 3 and the downlink carrier 4; and the base station of the macro cell schedules PUSCH transmission over the uplink carrier 1:

At the UE side, the UE receives the downlink data respectively over the downlink carriers 1 to 4, and generates corresponding ACK/NACK feedback information; and transmits the ACK/NACK feedback information corresponding to the downlink carriers 1 and 2 concurrently through the PUSCH, and transmits the ACK/NACK feedback information corresponding to the downlink carriers 3 and 4 through a PUCCH-2, over the uplink carrier 1:

Here a resource for the PUCCH-2 is a resource known to the base station of the small cell, and particularly firstly the base station of the macro cell can notify in advance the base station of the small cell of a pool of PUCCH resources over the uplink carrier, which are reserved for the small cell through communication between the base stations, and then the base station of the small cell can allocate to the UE a resource in its corresponding pool of PUCCH resources reserved over the uplink carrier, where the base station of the small cell can configure the UE with the resource in its corresponding reserved pool of PUCCH resources over the uplink carrier particularly in the same way as the macro cell; and At the base station side, the base station of the macro cell receives the ACK/NACK feedback information corresponding to the downlink carrier 1 and the downlink carrier 2 through the PUSCH resource over the uplink carrier 1, and the base station of the small cell receives the ACK/NACK feedback information corresponding to the downlink carrier 3 and the downlink carrier 4 through the PUCCH-2 over the uplink carrier 1.

It shall be noted that all of the three particular embodiments above have been described above by way of an example where the uplink control information is ACK/NACK, but ACK/NACK in the embodiments above can be replaced with CSI, or ACK/NACK in the embodiments above can be replaced with ACK/NACK and CSI.

The process flows of the methods above can be performed in software program which can be stored in a storage medium, where the operations in the methods above are performed by the software program being invoked.

Based upon the same inventive idea, an embodiment of the invention further provides a terminal, and since the terminal addresses the problem under a similar principle to the method above for transmitting feedback information, reference can be made to the implementation of the method for an implementation of the terminal, so a repeated description thereof will be omitted here.

Figure 9:
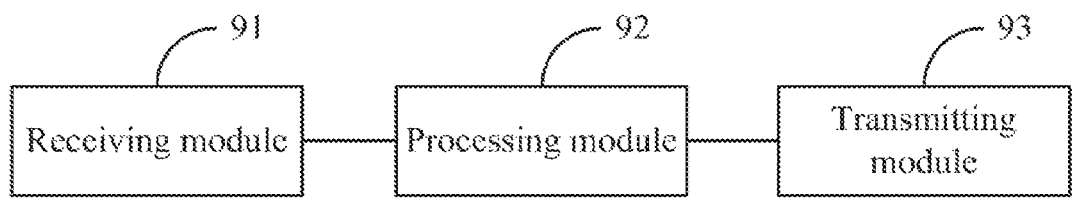
FIG. 9 is a schematic diagram of a terminal according to an embodiment of the invention.

Referring to FIG. 9, an embodiment of the invention provides a terminal applicable to a dual connectivity scenario, the terminal including:

A receiving module 91 is configured to receive data over a first carrier, and to receive data over a second carrier, where the data over the first carrier are scheduled by a first base station, and the data over the second carrier are scheduled by a second base station;

A processing module 92 is configured to generate first uplink control information for the first carrier and/or to generate second uplink control information for the second carrier; and A transmitting module 93 is configured to transmit the uplink control information generated by the processing module 92, including at least one of the first uplink control information and the second uplink control information, through a PUCCH and/or a PUSCH over one uplink carrier.

In an embodiment of the invention, the one uplink carrier over which the uplink control information is transmitted is particularly:

Only one uplink carrier over which uplink data are transmitted, configured by the network side for the terminal; or predefined or pre-configured one of a plurality of uplink carriers over which uplink data are transmitted, configured by the network side for the terminal; or an uplink primary carrier of the terminal.

In an implementation, the processing module 92 is configured:

In a first approach, to trigger the transmitting module 93 to transmit the first uplink control information and the second uplink control information concurrently through the same PUCCH or PUSCH over the one uplink carrier; or In a second approach, to trigger the transmitting module 93 to transmit the first uplink control information through a first PUCCH using a first PUCCH resource over the one uplink carrier and/or to transmit the second uplink control information through a second PUCCH of a second PUCCH resource over the one uplink carrier; or In a third approach, if there is a first PUSCH scheduled by the first base station over the one uplink carrier, to trigger the transmitting module 93 to transmit the first uplink control information through the first PUSCH over the one uplink carrier; otherwise, to trigger the transmitting module 93 to transmit the first uplink control information through a first PUCCH using a first PUCCH resource over the one uplink carrier; and/or if there is a second PUSCH scheduled by the second base station over the one uplink carrier, to trigger the transmitting module 93 to transmit the second uplink control information through the second PUSCH over the one uplink carrier; otherwise, to trigger the transmitting module 93 to transmit the second uplink control information through a second PUCCH of a second PUCCH resource over the one uplink carrier;

Here the first PUCCH resource is different from the second PUCCH resource.

For the first approach, the processing module 92 is configured:

To cascade the first uplink control information and the second uplink control information in a predefined cascade scheme; and to transmit the cascaded uplink control information in the same PUCCH or PUSCH over the one uplink carrier.

For the first approach, if the uplink control information includes Acknowledgement (ACK)/Negative Acknowledgement (NACK) feedback information, then the processing module 92 is configured:

To generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, where if there is no data received over the first carrier, then NACK/DTX will be taken as ACK/NACK feedback information corresponding to the first carrier; and To generate ACK/NACK for downlink sub-frames in which data are received over the second carrier, and to generate NACK/DTX for downlink sub-frames in which no data are received over the second carrier, as ACK/NACK feedback information corresponding to the second carrier, where if there is no data received over the second carrier, then NACK/DTX will be taken as ACK/NACK feedback information corresponding to the second carrier.

For the first approach, the processing module 92 is further configured:

To determine a PUCCH resource over which the uplink control information is to be transmitted, according to received configuration information transmitted by the first base station in higher-layer signaling.

For the second approach and the third approach, if the uplink control information includes ACK/NACK feedback information, then the processing module 92 is configured:

To generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, where if there is no data received over the first carrier, then no ACK/NACK feedback information corresponding to the first carrier will be generated; and To generate ACK/NACK for downlink sub-frames in which data are received over the second carrier, and to generate NACK/DTX for downlink sub-frames in which no data are received over the second carrier, as ACK/NACK feedback information corresponding to the second carrier, where if there is no data received over the second carrier, then no ACK/NACK feedback information corresponding to the second carrier will be generated.

For the second approach and the third approach, if the uplink control information includes ACK/NACK feedback information, then the processing module 92 is further configured:

To determine the first PUCCH resource for the first PUCCH according to received configuration information transmitted by the first base station in higher-layer signaling; or to determine at least one of a plurality of PUCCH resources pre-configured by the first base station for the terminal, as the first PUCCH resource according to an ARI in a received PDCCH or EPDCCH transmitted by the first base station:

And/or

To determine the second PUCCH resource for the second PUCCH according to received configuration information transmitted by the first base station; or to determine the second PUCCH resource for the second PUCCH according to received configuration information transmitted by the second base station; or to determine the second PUCCH resource for the second PUCCH according to an ARI in a received PDCCH or EPDCCH transmitted by the second base station, where the second PUCCH resource is at least one of all the available PUCCH resources of the second base station which is notified in advance by the first base station.

For the second approach and the third approach, if the uplink control information includes CSI feedback information, then the processing module 92 is further configured:

To determine the first PUCCH resource for the first PUCCH according to received configuration information transmitted by the first base station in higher-layer signaling:

And/or

To determine the second PUCCH resource for the second PUCCH according to received configuration information transmitted by the first base station in higher-layer signaling; or to determine the second PUCCH resource for the second PUCCH according to received configuration information transmitted by the second base station, where the second PUCCH resource is at least one of all the available PUCCH resources of the second base station which is notified in advance by the first base station.

Based upon the same inventive idea, an embodiment of the invention further provides a base station, and since the base station addresses the problem under a similar principle to the method above for receiving feedback information, reference can be made to the implementation of the method for an implementation of the base station, so a repeated description thereof will be omitted here.

Figure 10:
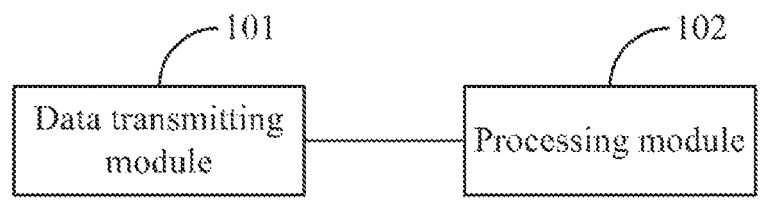
FIG. 10 is a schematic diagram of a base station according to an embodiment of the invention.

Referring to FIG. 10, an embodiment of the invention provides a base station applicable to a dual connectivity scenario, the base station including:

A data transmitting module 101 is configured to transmit data for a terminal over a first carrier, where the terminal is configured with at least the first carrier and a second carrier; and the data over the first carrier are scheduled by the present base station, and data over the second carrier are scheduled by a second base station; and A processing module 102 is configured to receive uplink control information transmitted by the terminal, through a PUCCH or a PUSCH over one uplink carrier over which uplink control information corresponding to the respective base stations scheduling data to the terminal is transmitted.

In an embodiment of the invention, the one uplink carrier over which the uplink control information transmitted by the terminal is received is particularly:

Only one uplink carrier over which uplink data are transmitted, configured by the network side for the terminal; or predefined or pre-configured one of a plurality of uplink carriers over which uplink data are transmitted, configured by the network side for the terminal; or an uplink primary carrier of the terminal.

In an implementation, the processing module 102 is configured:

In a first approach, to receive the uplink control information including first uplink control information and second uplink control information, through one PUCCH or PUSCH over the one uplink carrier; or In a second approach, to receive the uplink control information including only the first uplink control information but no second uplink control information through a first PUCCH using a first PUCCH resource over the one uplink carrier; or In a third approach, if a first PUSCH is scheduled over the first carrier, to receive the uplink control information through the first PUSCH over the one uplink carrier; otherwise, to receive the uplink control information through a first PUCCH using a first PUCCH resource over the one uplink carrier, where the uplink control information includes first uplink control information but no second uplink control information.

For the first approach, after the uplink control information is received over the one uplink carrier, the processing module 102 is further configured:

To obtain the first uplink control information from the uplink control information in a predefined cascade scheme.

For the first approach, before the uplink control information is received over the one uplink carrier, the processing module 102 is further configured:

To transmit configuration information to the terminal in higher-layer signaling to indicate to the terminal at least one PUCCH resource over which the uplink control information is to be transmitted.

For the first approach, the data transmitting module 101 is further configured:

To notify the second base station of a PUCCH resource configured for the terminal.

For the second approach and the third approach, if the uplink control information includes ACK/NACK feedback information, then the processing module 102 is further configured:

To transmit configuration information to the terminal in higher-layer signaling to indicate the first PUCCH resource; or to indicate to the terminal at least one of a plurality of PUCCH resources pre-configured for the terminal, as the first PUCCH resource using an ARI in a PDCCH or an EPDCCH;

And/or

To transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

For the second approach and the third approach, if the uplink control information includes CSI feedback information, then the processing module 102 is further configured:

To transmit configuration information to the terminal in higher-layer signaling to indicate the first PUCCH resource;

And/or

To transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

The structure of and processing by a terminal according to an embodiment of the invention will be described below in connection with a hardware structure thereof.

In the embodiment illustrated in FIG. 9, the terminal comprises a transceiver, and at least one processor connected with the transceiver, where:

The transceiver is configured to receive data over a first carrier, and to receive data over a second carrier, where the data over the first carrier are scheduled by a first base station, and the data over the second carrier are scheduled by a second base station:

The processor is configured to generate first uplink control information for the first carrier and/or to generate second uplink control information for the second carrier; and to trigger the transceiver to transmit the uplink control information generated by the processor, including at least one of the first uplink control information and the second uplink control information, through a PUCCH and/or a PUSCH over one uplink carrier.

In an implementation, the processor is configured:

In a first approach, to trigger the transceiver to transmit the first uplink control information and the second uplink control information concurrently through the same PUCCH or PUSCH over the one uplink carrier; or In a second approach, to trigger the transceiver to transmit the first uplink control information through a first PUCCH using a first PUCCH resource over the one uplink carrier and/or to transmit the second uplink control information through a second PUCCH of a second PUCCH resource over the one uplink carrier; or In a third approach, if there is a first PUSCH scheduled by the first base station over the one uplink carrier, to trigger the transceiver to transmit the first uplink control information through the first PUSCH over the one uplink carrier; otherwise, to trigger the transceiver to transmit the first uplink control information through a first PUCCH using a first PUCCH resource over the one uplink carrier; and/or if there is a second PUSCH scheduled by the second base station over the one uplink carrier, to trigger the transceiver to transmit the second uplink control information through the second PUSCH over the one uplink carrier; otherwise, to trigger the transceiver to transmit the second uplink control information through a second PUCCH of a second PUCCH resource over the one uplink carrier:

Here the first PUCCH resource is different from the second PUCCH resource.

For the first approach, the processor is configured:

To cascade the first uplink control information and the second uplink control information in a predefined cascade scheme; and to transmit the cascaded uplink control information in the same PUCCH or PUSCH over the one uplink carrier.

For the first approach, if the uplink control information includes Acknowledgement (ACK)/Negative Acknowledgement (NACK) feedback information, then the processor is configured:

To generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, where if there is no data received over the first carrier, then NACK/DTX will be taken as ACK/NACK feedback information corresponding to the first carrier; and To generate ACK/NACK for downlink sub-frames in which data are received over the second carrier, and to generate NACK/DTX for downlink sub-frames in which no data are received over the second carrier, as ACK/NACK feedback information corresponding to the second carrier, where if there is no data received over the second carrier, then NACK/DTX will be taken as ACK/NACK feedback information corresponding to the second carrier.

For the first approach, the processor is further configured to determine a PUCCH resource over which the uplink control information is to be transmitted, according to configuration information, received by the transceiver, transmitted by the first base station in higher-layer signaling.

For the second approach and the third approach, if the uplink control information includes ACK/NACK feedback information, then the processor is configured:

To generate ACK/NACK for downlink sub-frames in which data are received over the first carrier, and to generate NACK/Discontinuous Transmission (DTX) for downlink sub-frames in which no data are received over the first carrier, as ACK/NACK feedback information corresponding to the first carrier, where if there is no data received over the first carrier, then no ACK/NACK feedback information corresponding to the first carrier will be generated; and To generate ACK/NACK for downlink sub-frames in which data are received over the second carrier, and to generate NACK/DTX for downlink sub-frames in which no data are received over the second carrier, as ACK/NACK feedback information corresponding to the second carrier, where if there is no data received over the second carrier, then no ACK/NACK feedback information corresponding to the second carrier will be generated.

For the second approach and the third approach, if the uplink control information includes ACK/NACK feedback information, then the processor is further configured:

To determine the first PUCCH resource for the first PUCCH according to configuration information, received by the transceiver, transmitted by the first base station in higher-layer signaling; or to determine at least one of a plurality of PUCCH resources pre-configured by the first base station for the terminal, as the first PUCCH resource according to an ARI in a PDCCH or EPDCCH, received by the transceiver, transmitted by the first base station;

And/or

To determine the second PUCCH resource for the second PUCCH according to configuration information, received by the transceiver, transmitted by the first base station; or to determine the second PUCCH resource for the second PUCCH according to configuration information, received by the transceiver, transmitted by the second base station; or to determine the second PUCCH resource for the second PUCCH according to an ARI in a PDCCH or EPDCCH, received by the transceiver, transmitted by the second base station, where the second PUCCH resource is at least one of all the available PUCCH resources of the second base station, which is notified in advance by the first base station.

For the second approach and the third approach, if the uplink control information includes CSI feedback information, then the processor is further configured:

To determine the first PUCCH resource for the first PUCCH according to configuration information, received by the transceiver, transmitted by the first base station in higher-layer signaling;

And/or

To determine the second PUCCH resource for the second PUCCH according to configuration information, received by the transceiver, transmitted by the first base station in higher-layer signaling; or to determine the second PUCCH resource for the second PUCCH according to configuration information, received by the transceiver, transmitted by the second base station, where the second PUCCH resource is at least one of all the available PUCCH resources of the second base station which is notified in advance by the first base station.

The structure of and processing by a base station according to an embodiment of the invention will be described below in connection with a hardware structure thereof.

In the embodiment illustrated in FIG. 10, the base station comprises a transceiver, and at least one processor connected with the transceiver, where:

The transceiver is configured to transmit data for a terminal over a first carrier, where the terminal is configured with at least the first carrier and a second carrier; and the data over the first carrier are scheduled by the present base station, and data over the second carrier are scheduled by a second base station; and The processor is configured to trigger the transceiver to receive uplink control information transmitted by the terminal, through a PUCCH or a PUSCH over one uplink carrier over which uplink control information corresponding to the respective base stations scheduling data to the terminal is transmitted.

In an implementation, the processor is configured:

In a first approach, to trigger the transceiver to receive the uplink control information including first uplink control information and second uplink control information, through one PUCCH or PUSCH over the one uplink carrier; or In a second approach, to trigger the transceiver to receive the uplink control information including only the first uplink control information but no second uplink control information through a first PUCCH using a first PUCCH resource over the one uplink carrier; or In a third approach, if a first PUSCH is scheduled over the first carrier, to trigger the transceiver to receive the uplink control information through the first PUSCH over the one uplink carrier; otherwise, to trigger the transceiver to receive the uplink control information through a first PUCCH using a first PUCCH resource over the one uplink carrier; where the uplink control information includes first uplink control information but no second uplink control information.

For the first approach, after the uplink control information is received over the one uplink carrier, the processor is further configured to obtain the first uplink control information from the uplink control information in a predefined cascade scheme.

For the first approach, before the uplink control information is received over the one uplink carrier, the processor is further configured to trigger the transceiver to transmit configuration information to the terminal in higher-layer signaling to indicate to the terminal at least one PUCCH resource over which the uplink control information is to be transmitted.

For the first approach, the transceiver is further configured to notify the second base station of a PUCCH resource configured for the terminal.

For the second approach and the third approach, if the uplink control information includes ACK/NACK feedback information, then the processor is further configured:

To trigger the transceiver to transmit configuration information to the terminal in higher-layer signaling to indicate the first PUCCH resource; or to indicate to the terminal at least one of a plurality of PUCCH resources pre-configured for the terminal, as the first PUCCH resource using an ARI in a PDCCH or an EPDCCH;

And/or

To trigger the transceiver to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

For the second approach and the third approach, if the uplink control information includes CSI feedback information, then the processor is further configured:

To trigger the transceiver to transmit configuration information to the terminal in higher-layer signaling to indicate the first PUCCH resource;

And/or

To trigger the transceiver to transmit configuration information to the terminal in higher-layer signaling to indicate the second PUCCH resource; or to notify in advance of all the PUCCH resources over the one uplink carrier which can be used by the second base station to the second base station so that the second base station configures the terminal with the second PUCCH resource.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting feedback information, the method comprising:
receiving, by a terminal, data over a first carrier, and receiving data over a second carrier, wherein the data over the first carrier are scheduled by a first base station, and the data over the second carrier are scheduled by a second base station;
generating, by the terminal, first uplink control information for the first carrier and/or generating, by the terminal, second uplink control information for the second carrier; and
transmitting, by the terminal, uplink control information generated by the terminal, comprising at least one of the first uplink control information and the second uplink control information, through a Physical Uplink Control Channel, PUCCH, and/or a Physical Uplink Shared Channel, PUSCH, over one uplink carrier;
wherein transmitting, by the terminal, the uplink control information through the PUCCH and/or the PUSCH over the one uplink carrier comprises:
in a first approach, transmitting, by the terminal, the first uplink control information and the second uplink control information concurrently through a same PUCCH or PUSCH over the one uplink carrier; or
in a second approach, transmitting, by the terminal, the first uplink control information through a first PUCCH using a first PUCCH resource over the one uplink carrier and/or transmitting the second uplink control information through a second PUCCH using a second PUCCH resource over the one uplink carrier; or
in a third approach, if there is a first PUSCH of the terminal, scheduled by the first base station over the one uplink carrier, then transmitting, by the terminal, the first uplink control information through the first PUSCH over the one uplink carrier; otherwise, transmitting, by the terminal, the first uplink control information through a first PUCCH using a first PUCCH resource over the one uplink carrier; and/or if there is a second PUSCH of the terminal, scheduled by the second base station over the one uplink carrier, then transmitting, by the terminal, the second uplink control information through the second PUSCH over the one uplink carrier; otherwise, transmitting, by the terminal, the second uplink control information through a second PUCCH using a second PUCCH resource over the one uplink carrier; wherein the first PUCCH resource is different from the second PUCCH resource;

wherein for the first approach, if the uplink control information comprises Acknowledgement, ACK, /Negative Acknowledgement, NACK, feedback information, then:

generating, by the terminal, the first uplink control information for the first carrier comprises: generating, by the terminal, ACK/NACK for downlink sub-frames in which data are received over the first carrier, and generating NACK/Discontinuous Transmission, DTX, for downlink sub-frames in which no data are received over the first carrier, as ACK/NACK feedback information corresponding to the first carrier, wherein if there is no data received over the first carrier, then the terminal will take NACK/DTX as ACK/NACK feedback information corresponding to the first carrier; and generating, by the terminal, the second uplink control information for the second carrier comprises: generating, by the terminal, ACK/NACK for downlink sub-frames in which data are received over the second carrier, and generating NACK/DTX for downlink sub-frames in which no data are received over the second carrier, as ACK/NACK feedback information corresponding to the second carrier, wherein if there is no data received over the second carrier, then the terminal will take NACK/DTX as ACK/NACK feedback information corresponding to the second carrier;

wherein for the second approach and the third approach, if the uplink control information comprises ACK/NACK feedback information, then:

generating, by the terminal, the first uplink control information for the first carrier comprises: generating, by the terminal, ACK/NACK for downlink sub-frames in which data are received over the first carrier, and generating NACK/DTX, for downlink sub-frames in which no data are received over the first carrier, as ACK/NACK feedback information corresponding to the first carrier, wherein if there is no data received over the first carrier, then the terminal will not generate ACK/NACK feedback information corresponding to the first carrier; and generating, by the terminal, the second uplink control information for the second carrier comprises: generating, by the terminal, ACK/NACK for downlink sub-frames in which data are received over the second carrier, and generating NACK/DTX for downlink sub-frames in which no data are received over the second carrier, as ACK/NACK feedback information corresponding to the second carrier, wherein if there is no data received over the second carrier, then the terminal will not generate ACK/NACK feedback information corresponding to the second carrier.

2. The method according to claim 1, wherein for the first approach:

the terminal cascades the first uplink control information and the second uplink control information in a predefined cascade scheme; and the terminal transmits the cascaded uplink control information in the same PUCCH or PUSCH over the one uplink carrier.

3. The method according to claim 1, wherein for the first approach, before the terminal transmits the uplink control information through the PUCCH and/or the PUSCH over the one uplink carrier, the method further comprises:

determining, by the terminal, a PUCCH resource over which the uplink control information is to be transmitted, according to received configuration information transmitted by the first base station in higher-layer signaling;

and/or for the second approach and the third approach, if the uplink control information comprises ACK/NACK feedback information, then before the terminal transmits the uplink control information through the PUCCH and/or the PUSCH over the one uplink carrier, the method further comprises:

determining, by the terminal, the first PUCCH resource for the first PUCCH according to received configuration information transmitted by the first base station in higher-layer signaling; or determining, by the terminal, at least one of a plurality of PUCCH resources pre-configured by the first base station for the terminal, as the first PUCCH resource according to an ACK/NACK Resource Indicator, ARI, in a received Physical Downlink Control Channel, PDCCH or Enhanced PDCCH, EPDCCH, transmitted by the first base station; and/or determining, by the terminal, the second PUCCH resource for the second PUCCH according to received configuration information transmitted by the first base station; or determining, by the terminal, the second PUCCH resource for the second PUCCH according to received configuration information transmitted by the second base station; or determining, by the terminal, the second PUCCH resource for the second PUCCH according to an ARI in a received PDCCH or EPDCCH transmitted by the second base station, wherein the second PUCCH resource is at least one of all the available PUCCH resources of the second base station which is notified in advance by the first base station;

and/or for the second approach and the third approach, if the uplink control information comprises Channel State Information, CSI, feedback information, then before the terminal transmits the uplink control information through the PUCCH and/or the PUSCH over the one uplink carrier, the method further comprises:

determining, by the terminal, the first PUCCH resource for the first PUCCH according to received configuration information transmitted by the first base station in higher-layer signaling; and/or determining, by the terminal, the second PUCCH resource for the second PUCCH according to received configuration information transmitted by the first base station in higher-layer signaling; or
determining, by the terminal, the second PUCCH resource for the second PUCCH according to received configuration information transmitted by the second base station, wherein the second PUCCH resource is at least one of all the available PUCCH resources of the second base station which is notified in advance by the first base station.

4. The method according to claim 3, wherein the ARI is:
a fixed bit field in the EPDCCHs transmitted by the first base station and the second base station; or
an added bit field in the PDCCHs transmitted by the first base station and the second base station; or
a reused Transmit Power Control, TPC, field in all other PDCCHs transmitted by the first base station than a PDCCH corresponding to a Downlink Assignment Index, DAI, =1 of a Primary Component Carrier, PCC, if the first base station operates in a Time Division Duplex, TDD, system.

5. A method for receiving feedback information, the method comprising:
transmitting, by a first base station, data for a terminal over a first carrier, wherein the terminal is configured with at least the first carrier and a second carrier; and the data over the first carrier are scheduled by the first base station, and data over the second carrier are scheduled by a second base station; and
receiving, by the first base station, uplink control information transmitted by the terminal, through a Physical Uplink Control Channel, PUCCH, and/or a Physical Uplink Shared Channel, PUSCH, over one uplink carrier over which uplink control information corresponding to the respective base stations scheduling data to the terminal is transmitted;
wherein receiving, by the first base station, the uplink control information transmitted by the terminal, through the PUCCH or the PUSCH over the one uplink carrier comprises:
in a first approach, receiving, by the first base station, the uplink control information comprising first uplink control information and second uplink control information, through one PUCCH or PUSCH over the one uplink carrier; or
in a second approach, receiving, by the first base station, the uplink control information comprising only the first uplink control information but no second uplink control information through a first PUCCH using a first PUCCH resource over the one uplink carrier; or
in a third approach, if the first base station schedules a first PUSCH over the first carrier, then receiving, by the first base station, the uplink control information in the first PUSCH over the one uplink carrier; otherwise, receiving, by the first base station, the uplink control information through a first PUCCH using a first PUCCH resource over the one uplink carrier; wherein the uplink control information comprises only the first uplink control information but no second uplink control information;
wherein for the first approach, if the uplink control information comprises Acknowledgement, ACK, /Negative Acknowledgement, NACK, feedback information, then:
the first uplink control information for the first carrier is generated by the terminal as follows: the terminal generates ACK/NACK for downlink sub-frames in which data are received over the first carrier, and generates NACK/Discontinuous Transmission, DTX, for downlink sub-frames in which no data are received over the first carrier, as ACK/NACK feedback information corresponding to the first carrier, wherein if there is no data received over the first carrier, then the terminal will take NACK/DTX as ACK/NACK feedback information corresponding to the first carrier; and
the second uplink control information for the second carrier is generated by the terminal as follows: the terminal generates ACK/NACK for downlink sub-frames in which data are received over the second carrier, and generates NACK/DTX for downlink sub-frames in which no data are received over the second carrier, as ACK/NACK feedback information corresponding to the second carrier, wherein if there is no data received over the second carrier, then the terminal will take NACK/DTX as ACK/NACK feedback information corresponding to the second carrier;
wherein for the second approach and the third approach, if the uplink control information comprises ACK/NACK feedback information, then:
the first uplink control information for the first carrier is generated by the terminal as follows: the terminal generates ACK/NACK for downlink sub-frames in which data are received over the first carrier, and generating NACK/DTX, for downlink sub-frames in which no data are received over the first carrier, as ACK/NACK feedback information corresponding to the first carrier, wherein if there is no data received over the first carrier, then the terminal will not generate ACK/NACK feedback information corresponding to the first carrier; and
the second uplink control information for the second carrier is generated by the terminal as follows: the terminal generates ACK/NACK for downlink sub-frames in which data are received over the second carrier, and generates NACK/DTX for downlink sub-frames in which no data are received over the second carrier, as ACK/NACK feedback information corresponding to the second carrier, wherein if there is no data received over the second carrier, then the terminal will not generate ACK/NACK feedback information corresponding to the second carrier.

6. The method according to claim 5, wherein for the first approach, after the first base station receives the uplink control information over the one uplink carrier, the method further comprises:
obtaining, by the first base station, the first uplink control information from the uplink control information in a predefined cascade scheme.

7. The method according to claim 5, wherein for the first approach, before the first base station receives the uplink control information over the one uplink carrier, the method further comprises:
transmitting, by the first base station, configuration information to the terminal in higher-layer signaling to indicate to the terminal at least one PUCCH resource over which the uplink control information is to be transmitted;

and/or for the first approach, the method further comprises:
  notifying, by the first base station, the second base station of a PUCCH resource configured for the terminal;

and/or for the second approach and the third approach, if the uplink control information comprises Acknowledgement, ACK, /Negative Acknowledgement, NACK, feedback information, then before the first base station receives the uplink control information over the one uplink carrier, the method further comprises:
  transmitting, by the first base station, configuration information to the terminal in higher-layer signaling to indicate the first PUCCH resource; or indicating, by the first base station, to the terminal at least one of a plurality of PUCCH resources pre-configured by the first base station for the terminal, as the first PUCCH resource using an ACK/NACK Resource Indicator, ARI, in a Physical Downlink Control Channel, PDCCH or Enhanced PDCCH, EPDCCH; and/or
  transmitting, by the first base station, configuration information to the terminal in higher-layer signaling to indicate the second PUCCH resource; or notifying, by the first base station in advance, all PUCCH resources over the one uplink carrier which can be used by the second base station to the second base station so that the second base station configures the terminal with the second PUCCH resource;

and/or for the second approach and the third approach, if the uplink control information comprises Channel State Information, CSI, feedback information, then before the first base station receives the uplink control information over the one uplink carrier, the method further comprises:
  transmitting, by the first base station, configuration information to the terminal in higher-layer signaling to indicate the first PUCCH resource; and/or
  transmitting, by the first base station, configuration information to the terminal in higher-layer signaling to indicate the second PUCCH resource; or notifying, by the first base station in advance, all PUCCH resources over the one uplink carrier which can be used by the second base station to the second base station so that the second base station configures the terminal with the second PUCCH resource.

8. The method according to claim 7, wherein the ARI is:
a fixed bit field in the EPDCCHs transmitted by the first base station and the second base station; or
an added bit field in the PDCCHs transmitted by the first base station and the second base station; or
a reused Transmit Power Control, TPC, field in all other PDCCHs transmitted by the first base station than a PDCCH corresponding to a Downlink Assignment Index, DAI, =1 of a PCC if the first base station operates in a Time Division Duplex, TDD, system.

9. A terminal, comprising:
a receiving module configured to receive data over a first carrier, and to receive data over a second carrier, wherein the data over the first carrier are scheduled by a first base station, and the data over the second carrier are scheduled by a second base station;
a processing module configured to generate first uplink control information for the first carrier and/or to generate second uplink control information for the second carrier; and
a transmitting module configured to transmit the uplink control information generated by the processing module, comprising at least one of the first uplink control information and the second uplink control information, through a Physical Uplink Control Channel, PUCCH, and/or a Physical Uplink Shared Channel, PUSCH, over one uplink carrier;
wherein the processing module is configured:
in a first approach, to trigger the transmitting module to transmit the first uplink control information and the second uplink control information concurrently through a same PUCCH or PUSCH over the one uplink carrier; or
in a second approach, to trigger the transmitting module to transmit the first uplink control information through a first PUCCH using a first PUCCH resource over the one uplink carrier and/or to transmit the second uplink control information through a second PUCCH of a second PUCCH resource over the one uplink carrier; or
in a third approach, if there is a first PUSCH scheduled by the first base station over the one uplink carrier, to trigger the transmitting module to transmit the first uplink control information through the first PUSCH over the one uplink carrier; otherwise, to trigger the transmitting module to transmit the first uplink control information through a first PUCCH using a first PUCCH resource over the one uplink carrier; and/or if there is a second PUSCH scheduled by the second base station over the one uplink carrier, to trigger the transmitting module to transmit the second uplink control information through the second PUSCH over the one uplink carrier; otherwise, to trigger the transmitting module to transmit the second uplink control information through a second PUCCH of a second PUCCH resource over the one uplink carrier;
wherein the first PUCCH resource is different from the second PUCCH resource;
wherein:
for the first approach, if the uplink control information comprises Acknowledgement, ACK, /Negative Acknowledgement, NACK, feedback information, then the processing module is configured:
  to generate ACK/NACK for downlink sub-frames in which data are received over the first carrier, and to generate NACK/Discontinuous Transmission, DTX, for downlink sub-frames in which no data are received over the first carrier, as ACK/NACK feedback information corresponding to the first carrier, wherein if there is no data received over the first carrier, then NACK/DTX will be taken as ACK/NACK feedback information corresponding to the first carrier; and
  to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then NACK/DTX will be taken as ACK/NACK feedback information corresponding to the second carrier;

for the second approach and the third approach, if the uplink control information comprises ACK/NACK feedback information, then the processing module is configured:
  to generate ACK/NACK for downlink sub-frames in which data are received over the first carrier, and to generate NACK/Discontinuous Transmission, DTX, for downlink sub-frames in which no data are received over the first carrier, as ACK/NACK feedback information corresponding to the first carrier, wherein if there is no data received over the first carrier, then no ACK/NACK feedback information corresponding to the first carrier will be generated; and
  to generate ACK/NACK for downlink sub-frames in which data are received over the second carrier, and to generate NACK/DTX for downlink sub-frames in which no data are received over the second carrier, as ACK/NACK feedback information corresponding to the second carrier, wherein if there is no data received over the second carrier, then no ACK/NACK feedback information corresponding to the second carrier will be generated.

10. The terminal according to claim 9, wherein for the first approach, the processing module is configured:
  to cascade the first uplink control information and the second uplink control information in a predefined cascade scheme; and to transmit the cascaded uplink control information in the same PUCCH or PUSCH over the one uplink carrier.

11. The terminal according to claim 9, wherein for the first approach, the processing module is further configured:
  to determine a PUCCH resource over which the uplink control information is to be transmitted, according to received configuration information transmitted by the first base station in higher-layer signaling;
  and/or
  for the second approach and the third approach, if the uplink control information comprises ACK/NACK feedback information, then the processing module is further configured:
    to determine the first PUCCH resource for the first PUCCH according to received configuration information transmitted by the first base station in higher-layer signaling; or to determine at least one of a plurality of PUCCH resources pre-configured by the first base station for the terminal, as the first PUCCH resource according to an ARI in a received Physical Downlink Control Channel, PDCCH or Enhanced PDCCH, EPDCCH, transmitted by the first base station; and/or
    to determine the second PUCCH resource for the second PUCCH according to received configuration information transmitted by the first base station; or to determine the second PUCCH resource for the second PUCCH according to received configuration information transmitted by the second base station; or to determine the second PUCCH resource for the second PUCCH according to an ARI in a received PDCCH or EPDCCH transmitted by the second base station, wherein the second PUCCH resource is at least one of all the available PUCCH resources of the second base station which is notified in advance by the first base station;
  and/or
  for the second approach and the third approach, if the uplink control information comprises CSI feedback information, then the processing module is further configured:
    to determine the first PUCCH resource for the first PUCCH according to received configuration information transmitted by the first base station in higher-layer signaling; and/or
    to determine the second PUCCH resource for the second PUCCH according to received configuration information transmitted by the first base station in higher-layer signaling; or to determine the second PUCCH resource for the second PUCCH according to received configuration information transmitted by the second base station, wherein the second PUCCH resource is at least one of all the available PUCCH resources of the second base station which is notified in advance by the first base station.

12. A base station, comprising:
  a data transmitting module configured to transmit data for a terminal over a first carrier, wherein the terminal is configured with at least the first carrier and a second carrier; and the data over the first carrier are scheduled by the present base station, and data over the second carrier are scheduled by a second base station; and
  a processing module configured to receive uplink control information transmitted by the terminal, through a Physical Uplink Control Channel, PUCCH, and/or a Physical Uplink Shared Channel, PUSCH, over one uplink carrier over which uplink control information corresponding to the respective base stations scheduling data to the terminal is transmitted,
  wherein the processing module is configured:
  in a first approach, to receive the uplink control information comprising first uplink control information and second uplink control information, through one PUCCH or PUSCH over the one uplink carrier; or
  in a second approach, to receive the uplink control information comprising only the first uplink control information but no second uplink control information through a first PUCCH using a first PUCCH resource over the one uplink carrier; or
  in a third approach, if a first PUSCH is scheduled over the first carrier, to receive the uplink control information through the first PUSCH over the one uplink carrier; otherwise, to receive the uplink control information through a first PUCCH using a first PUCCH resource over the one uplink carrier; wherein the uplink control information comprises only the first uplink control information but no second uplink control information;
  wherein for the first approach, if the uplink control information comprises Acknowledgement, ACK, /Negative Acknowledgement, NACK, feedback information, then:
    the first uplink control information for the first carrier is generated by the terminal as follows: the terminal generates ACK/NACK for downlink sub-frames in which data are received over the first carrier, and generates NACK/Discontinuous Transmission, DTX, for downlink sub-frames in which no data are received over the first carrier, as ACK/NACK feedback information corresponding to the first carrier, wherein if there is no data received over the first carrier, then the terminal will take NACK/DTX as ACK/NACK feedback information corresponding to the first carrier; and the second uplink control information for the second carrier is generated by the terminal as follows: the terminal generates ACK/NACK for downlink sub-frames in which data are received over the second carrier, and generates NACK/DTX for downlink sub-frames in which no data are received over the second carrier, as ACK/NACK feedback information corresponding to the second carrier, wherein if there is no data received over the second carrier, then the terminal will take NACK/DTX as ACK/NACK feedback information corresponding to the second carrier;

wherein for the second approach and the third approach, if the uplink control information comprises ACK/NACK feedback information, then:
the first uplink control information for the first carrier is generated by the terminal as follows: the terminal generates ACK/NACK for downlink sub-frames in which data are received over the first carrier, and generating NACK/DTX, for downlink sub-frames in which no data are received over the first carrier, as ACK/NACK feedback information corresponding to the first carrier, wherein if there is no data received over the first carrier, then the terminal will not generate ACK/NACK feedback information corresponding to the first carrier; and
the second uplink control information for the second carrier is generated by the terminal as follows: the terminal generates ACK/NACK for downlink sub-frames in which data are received over the second carrier, and generates NACK/DTX for downlink sub-frames in which no data are received over the second carrier, as ACK/NACK feedback information corresponding to the second carrier, wherein if there is no data received over the second carrier, then the terminal will not generate ACK/NACK feedback information corresponding to the second carrier.

13. The base station according to claim 12, wherein for the first approach, after the uplink control information is received over the one uplink carrier, the processing module is further configured:
to obtain the first uplink control information from the uplink control information in a predefined cascade scheme.

14. The base station according to claim 12, wherein for the first approach, before the uplink control information is received over the one uplink carrier, the processing module is further configured:

to transmit configuration information to the terminal in higher-layer signaling to indicate to the terminal at least one PUCCH resource over which the uplink control information is to be transmitted;
and/or
for the first approach, the data transmitting module is further configured:
to notify the second base station of a PUCCH resource configured for the terminal;
and/or
for the second approach and the third approach, if the uplink control information comprises Acknowledgement, ACK, /Negative Acknowledgement, NACK, feedback information, then the processing module is further configured:
to transmit configuration information to the terminal in higher-layer signaling to indicate the first PUCCH resource; or to indicate to the terminal at least one of a plurality of PUCCH resources pre-configured for the terminal, as the first PUCCH resource using an ACK/NACK Resource Indicator, ARI, in a Physical Downlink Control Channel, PDCCH or Enhanced PDCCH, EPDCCH; and/or
to transmit configuration information to the terminal in higher-layer signaling to indicate the second PUCCH resource; or to notify in advance of all PUCCH resources over the one uplink carrier which can be used by the second base station to the second base station so that the second base station configures the terminal with the second PUCCH resource;
and/or
for the second approach and the third approach, if the uplink control information comprises CSI feedback information, then the processing module is further configured:
to transmit configuration information to the terminal in higher-layer signaling to indicate the first PUCCH resource; and/or
to transmit configuration information to the terminal in higher-layer signaling to indicate the second PUCCH resource; or to notify in advance all PUCCH resources over the one uplink carrier which can be used by the second base station to the second base station so that the second base station configures the terminal with the second PUCCH resource.

* * * * *